(12) United States Patent
Essiambre et al.

(10) Patent No.: US 8,320,769 B2
(45) Date of Patent: Nov. 27, 2012

(54) TRANSVERSE-MODE MULTIPLEXING FOR OPTICAL COMMUNICATION SYSTEMS

(75) Inventors: Rene'-Jean Essiambre, Red Bank, NJ (US); Roland Ryf, Aberdeen, NJ (US); Peter J. Winzer, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 366 days.

(21) Appl. No.: 12/492,399

(22) Filed: Jun. 26, 2009

(65) Prior Publication Data

US 2010/0329671 A1    Dec. 30, 2010

(51) Int. Cl.
H04B 10/12    (2006.01)
H04B 10/00    (2006.01)

(52) U.S. Cl. .................. 398/143; 398/140; 398/158

(58) Field of Classification Search .................. None
See application file for complete search history.

(56) References Cited

U.S. PATENT DOCUMENTS

| | | | |
|---|---|---|---|
| 5,379,142 A | 1/1995 | Handa | |
| 6,525,853 B1 * | 2/2003 | Stuart | 398/115 |
| 6,668,108 B1 * | 12/2003 | Helkey et al. | 385/18 |
| 6,797,983 B2 | 9/2004 | Chen et al. | 257/59 |
| 6,909,528 B2 | 6/2005 | Korzinin et al. | 359/3 |
| 6,940,577 B2 | 9/2005 | Kozhukh | 349/156 |
| 7,194,155 B1 | 3/2007 | Kahn et al. | |
| 7,268,852 B2 | 9/2007 | Kuan et al. | 349/165 |
| 7,315,575 B2 | 1/2008 | Sun et al. | |
| 7,323,275 B2 | 1/2008 | Otaki et al. | 430/1 |
| 7,327,914 B1 * | 2/2008 | Kahn et al. | 385/15 |
| 7,416,818 B2 | 8/2008 | Sutherland et al. | 430/2 |
| 7,630,643 B2 * | 12/2009 | Niiho et al. | 398/79 |
| 7,674,028 B2 | 3/2010 | Cassarly et al. | |
| 2002/0003923 A1 | 1/2002 | Ranka et al. | |
| 2003/0103718 A1 | 6/2003 | Chen | |
| 2005/0046865 A1 | 3/2005 | Brock et al. | |
| 2005/0213075 A1 | 9/2005 | Cooke | |
| 2007/0247687 A1 * | 10/2007 | Handschy et al. | 359/35 |
| 2007/0297806 A1 | 12/2007 | Kaneda et al. | 398/152 |
| 2008/0069561 A1 | 3/2008 | Kahn et al. | |

(Continued)

FOREIGN PATENT DOCUMENTS

GB    2399963 A    9/2004

OTHER PUBLICATIONS

U.S. Appl. No. 12/338,492.

(Continued)

*Primary Examiner* — Kenneth N Vanderpuye
*Assistant Examiner* — Amritbir Sandhu
(74) *Attorney, Agent, or Firm* — Mendelsohn, Drucker & Associates, P.C.; Steve Mendelsohn; Yuri Gruzdkov

(57) ABSTRACT

An optical communication system having an optical transmitter and an optical receiver optically coupled via a multi-path fiber. The optical transmitter launches, into the multi-path fiber, an optical transverse-mode-multiplexed (TMM) signal having a plurality of independently modulated components by coupling each independently modulated component into a respective transverse mode of the multi-path fiber. The TMM signal undergoes inter-mode mixing in the multi-path fiber before being received by the optical receiver. The optical receiver processes the received TMM signal to reverse the effects of inter-mode mixing and recover the data carried by each of the independently modulated components.

24 Claims, 15 Drawing Sheets
(2 of 15 Drawing Sheet(s) Filed in Color)

U.S. PATENT DOCUMENTS

| | | | |
|---|---|---|---|
| 2008/0193133 A1* | 8/2008 | Krug et al. | 398/83 |
| 2008/0273560 A1 | 11/2008 | Stelmakh | |
| 2009/0169220 A1* | 7/2009 | Kahn et al. | 398/200 |
| 2009/0244415 A1 | 10/2009 | Ide | |
| 2010/0138722 A1 | 6/2010 | Harley et al. | |
| 2010/0142971 A1 | 6/2010 | Chang et al. | |
| 2010/0215311 A1* | 8/2010 | Moore | 385/13 |
| 2010/0290738 A1 | 11/2010 | Yan et al. | |
| 2010/0296819 A1 | 11/2010 | Kahn et al. | |
| 2010/0329670 A1 | 12/2010 | Essiambre et al. | |
| 2010/0329671 A1 | 12/2010 | Essiambre et al. | |
| 2011/0150503 A1 | 6/2011 | Winzer | |

OTHER PUBLICATIONS

"Weakly Guiding Fibers," by D. Gloge, Applied Optics, vol. 10, No. 10, Oct. 1971, pp. 2252-2258.

"Polarization Engineering for LCD Projection," by M. G. Robinson, J. Chen, G. D. Sharp, Wiley, Chichester (England), 2005, Chapter 11, pp. 257-275.

"Capacity Enhancement in Coherent Optical MIMO (COMIMO) Multimode Fiber Links," by Rick C. J. Hsu et al., IEEE Communications Letters, vol. 10, No. 3, Mar. 2006, pp. 195-197.

"Fundamentals and Challenges of Optical Multiple-Input Multiple-Output Multimode Fiber Links," by Alireza Tarighat et al., Topics in Optical Communications, IEEE Communications Magazine, May 2007, pp. 57-63.

"Coherent Optical Multiple-Input Multiple-Output communication," by Rick C. J. Hsu et al., IEICE Electronics Express, vol. 1, No. 13, 2004, pp. 392-397.

"Coherent Optical MIMO (COMIMO)," by Akhil R. Shah et al., Journal of Lightwave Technology, vol. 23, No. 8, Aug. 2005, pp. 2410-2419.

"High Spectral Efficiency Coherent Optical OFDM for 1 Tb/s Ethernet Transport," by William Shieh, OWW1.pdf, OCIS codes: (060 2330) Fiber optics communications; (060. 1660) Coherent Communications, 2009, 3 pages.

International Search Report and Written Opinion in PCT/US2010/038701 Mailing Date: Sep. 13, 2010.

Guofeng, Wu., "Methods of Increasing the Bandwidth-Distance Product for Multimode Fibers in LAN." Journal of Optical Communications, vol. 29, Jan. 1, 2008, pp. 213-216.

U.S. Appl. No. 12/827,284, filed Jun. 30, 2010.

U.S. Appl. No. 12/827,641, filed Jun. 30, 2010.

"Fourier optics", Wikipedia,the free encyclopedia, "http://en.wikipedia.org/wiki/Fourier_optics", downloaded Aug. 31, 2011, 20 pages.

Jalali, et al., "Coherent Optical MIMO," 2005; Proc. of SPIE; vol. 5814; pp. 121-127.

O'Callaghan, et al., "Spatial Light Modulators with Integrated Phase Masks for Holographic Data Storage," 2006; IEEE; pp. 23-25.

Lin, et al., "Holographic Fabrication of Photonic Crystals Using Multidimensional Phase Masks," Dec. 2008; Journal of Applied Physics.

Stuart, H., "Dispersive Multiplexing in Multimode Optical Fiber," 2000; Science Magazine; pp. 281-283.

* cited by examiner

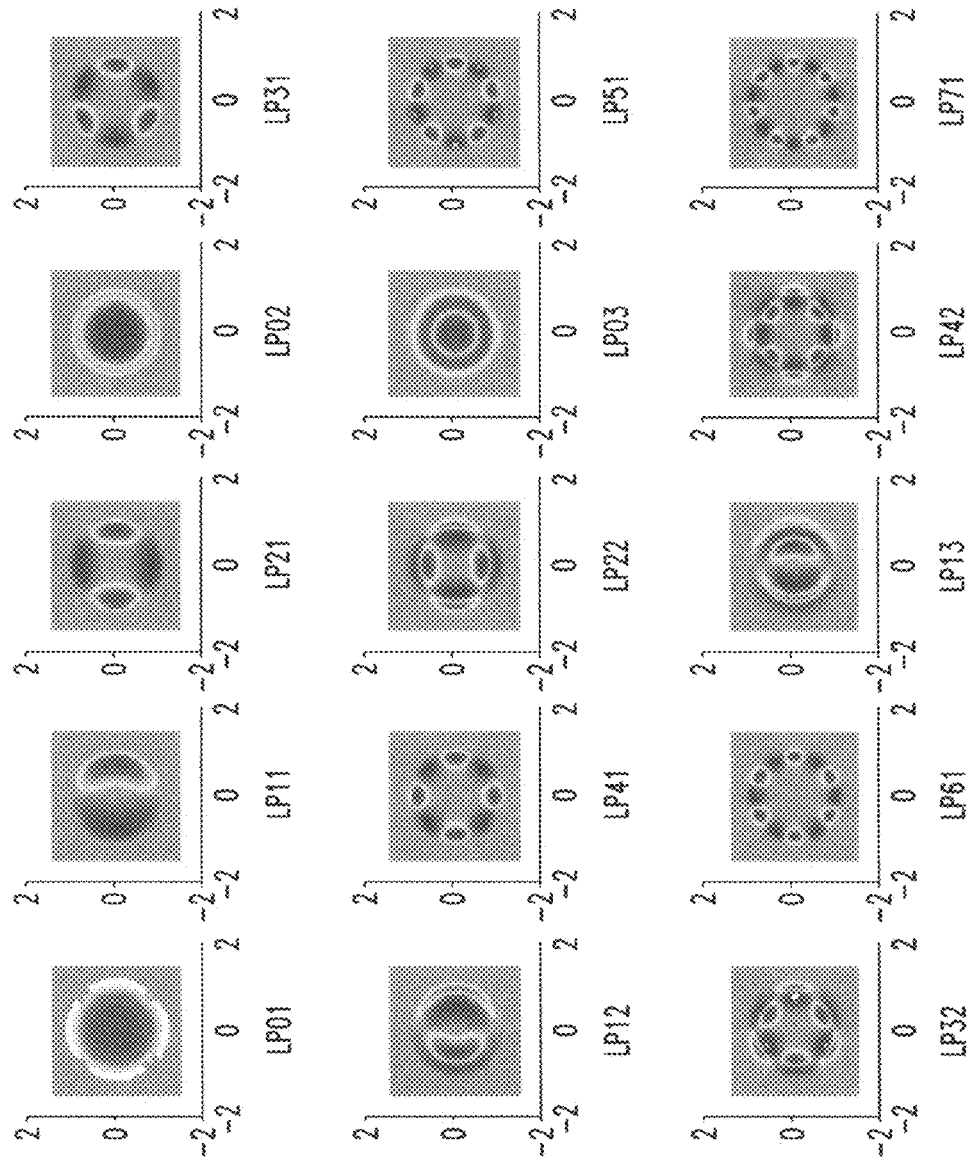

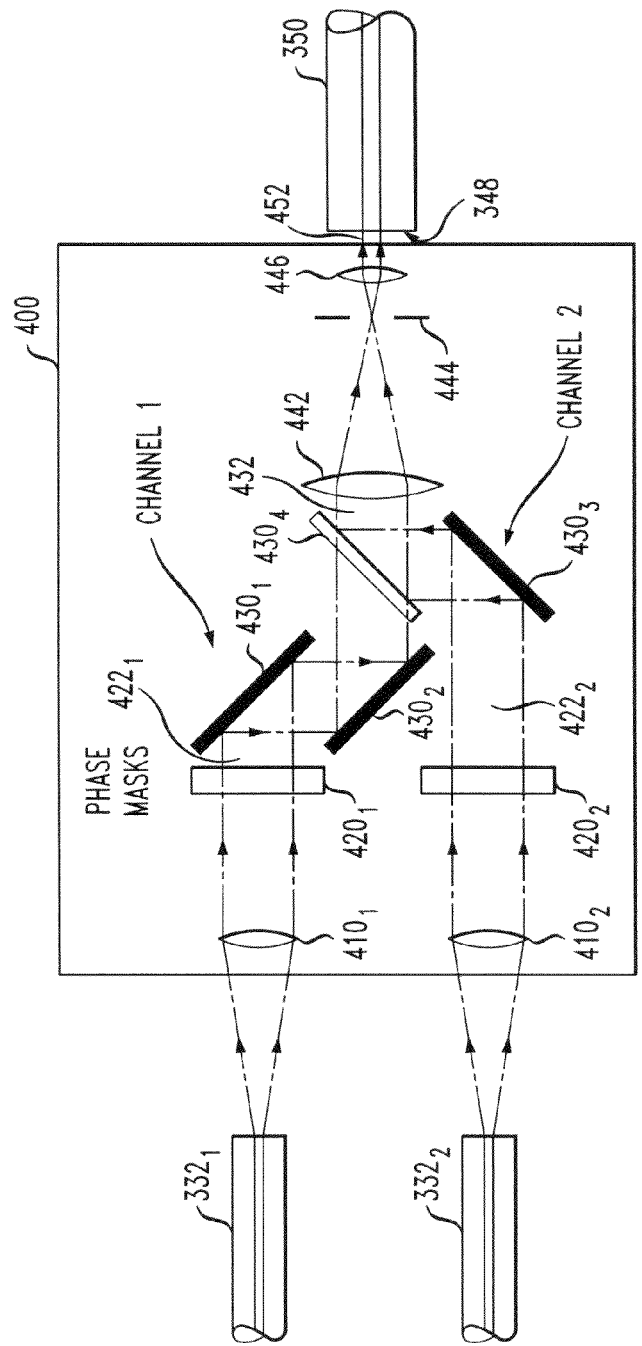

700

800

900

1010

TRANSVERSE-MODE MULTIPLEXING FOR OPTICAL COMMUNICATION SYSTEMS

CROSS-REFERENCE TO RELATED APPLICATIONS

The subject matter of this application is related to that of U.S. patent application Ser. No. 12/492,391, by R.-J. Essiambre, R. Ryf, and P. Winzer, filed on the same date as the present application, and entitled "Receiver for Optical Transverse-Mode-Multiplexed Signals," which application is incorporated herein by reference in its entirety.

BACKGROUND

1. Field of the Invention

The present invention relates to optical communication equipment and, more specifically but not exclusively, to the equipment that enables transverse-mode multiplexing (TMM) in optical communication systems.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Wireless communication systems with multiple-input multiple-output (MIMO) capabilities increase the overall transmission capacity by exploiting (instead of trying to mitigate) the multi-path delay spread in a wireless channel. More specifically, wireless MIMO improves efficiency and reliability through the use of multiple antennas at the transmitter and receiver. The resulting increase in average throughput is realized at the expense of greater complexity in signal processing and hardware implementation, but not at the expense of additional spectral bandwidth or higher signal power.

In optical communication systems, a MIMO approach to increasing the transmission capacity is feasible, for example, because modal dispersion in a multimode fiber is analogous to multi-path delay in a wireless transmission medium. Consequently, optical MIMO can be leveraged to exploit the inherently high transmission capacity of multimode fibers. However, the hardware for implementing optical MIMO is not yet sufficiently developed.

SUMMARY

Disclosed herein are various embodiments of an optical communication system having an optical transmitter and an optical receiver optically coupled via a multi-path fiber. The optical transmitter launches, into the multi-path fiber, an optical transverse-mode-multiplexed (TMM) signal having a plurality of independently modulated components by selectively coupling each independently modulated component into a respective single transverse mode of the multi-path fiber. The TMM signal undergoes inter-mode mixing in the multi-path fiber before being received by the optical receiver. The optical receiver processes the received TMM signal to reverse the effects of inter-mode mixing and recover the data carried by each of the independently modulated components.

According to one embodiment, provided is an optical communication system having: (A) a multi-path fiber that supports a plurality of transverse modes and (B) an optical transmitter coupled to a first end of the multi-path fiber and configured to launch an optical TMM signal having N independently modulated components such that, at the first end, each of the N independently modulated components corresponds to a respective single transverse mode of the multi-path fiber, where N is an integer greater than one. The optical communication system further has an optical receiver coupled to a second end of the multi-path fiber and configured to process the TMM signal received through the multi-path fiber to recover data carried by each of the N independently modulated components.

According to another embodiment, provided is an optical transmitter having: (A) a first plurality of fibers; and (B) an optical mode-coupling (OMC) module disposed between the first plurality of fibers and a multimode fiber. The multimode fiber supports a plurality of transverse modes. The OMC module processes optical signals received from the first plurality of fibers to launch into the multimode fiber an optical TMM signal that is based on said received optical signals. For each fiber of the first plurality, the OMC module filters the respective optical signal received from the fiber such that a resulting optical component of the TMM signal corresponds to a respective single transverse mode of the multimode fiber at a proximate terminus of the multimode fiber.

According to yet another embodiment, provided is a method of generating an optical TMM signal. The method has the steps of: (A) splitting an optical beam into N sub-beams, where N is an integer greater than one; (B) modulating each of the N sub-beams with data to produce N independently modulated optical signals; and (C) at a proximate terminus of a multi-path fiber, coupling into the multi-path fiber the N independently modulated optical signals to produce N independently modulated components of the TMM signal. The multi-path fiber supports a plurality of transverse modes. Each of the N independently modulated optical signals is coupled into the multi-path fiber such that a resulting independently modulated component of the TMM signal corresponds to a respective single transverse mode of the multi-path fiber at the proximate terminus of the multi-path fiber.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other aspects, features, and benefits of various embodiments of the invention will become more fully apparent, by way of example, from the following detailed description and the accompanying drawings, in which:

FIGS. 3A-B illustrate an optical transmitter that can be used in a node of the system shown in FIG. 1 according to one embodiment of the invention;

FIGS. 4A-B illustrate an optical mode-coupling (OMC) module that can be used in the transmitter of FIG. 3 according to one embodiment of the invention;

DETAILED DESCRIPTION

Optical Communication System

Figure 1:
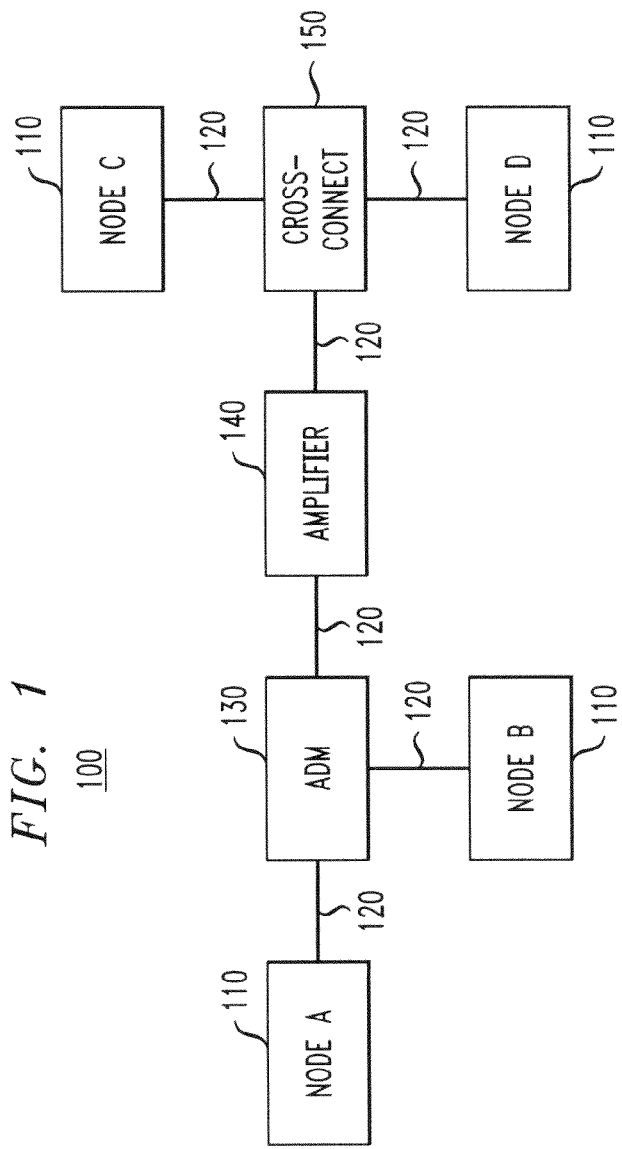
FIG. 1 shows a block diagram of an optical communication system, in which various embodiments of the invention can be practiced.

FIG. 1 shows a block diagram of an optical communication system 100, in which various embodiments of the invention can be practiced. System 100 has a plurality of communication nodes 110 interconnected via a network of optical communication links 120. System 100 further has an optical add/drop multiplexer (ADM) 130, an optical amplifier 140, and an optical cross-connect 150, all variously interposed between nodes 110.

Each node 110 has optical multiple-input multiple-output (MIMO) capabilities achieved through the use of transverse-mode multiplexing (TMM). Node 110 generally includes an optical transmitter and an optical receiver (neither is explicitly shown in FIG. 1) to enable two-way communications between various nodes of system 100. In addition to TMM multiplexing, an individual node 110 might also use wavelength-division multiplexing (WDM) and/or polarization multiplexing (PM), or both. Representative embodiments of an optical transmitter and receiver that can be used in individual nodes 110 are described in more detail below in the corresponding subsections of this specification.

Each optical communication link 120 is implemented using one or more of the following: (i) a single-mode fiber; (ii) a multimode fiber; (iii) a multi-core fiber; and (iv) a bundle of single-mode fibers. In one embodiment, a multimode fiber used in link 120 supports between two and about one hundred transverse modes. In an alternative embodiment, the multimode fiber supports more than one hundred transverse modes. In one embodiment, each core of a multi-core fiber used in link 120 supports a single transverse mode. In an alternative embodiment, some or all cores of the multi-core fiber support multiple transverse modes, as well as super-modes of the multi-core fiber taken as a whole.

As used herein, the term "transverse mode" refers to a guided electromagnetic wave having an electric- or magnetic-field distribution (hereafter referred to as optical-field distribution), in a plane perpendicular (i.e. transverse) to the propagation direction, that is substantially independent of the propagation distance. More specifically, if a loss or a gain of optical power in the fiber is factored out, then the mode's optical-field distributions measured at two different locations along the fiber will only differ by a factor that reflects the overall phase change accrued by the mode between those two locations. Each transverse mode is an eigenmode of the fiber, and different transverse modes are mutually orthogonal. In general, an optical fiber can support a fixed number of transverse modes whose optical-field distributions and propagation constants are unequivocally determined by the waveguide structure, material properties, and optical frequency (wavelength). Note that the concept of transverse modes is applicable to various types of fiber, including the multi-core fiber. For example, a transverse mode of an individual core in a multi-core fiber is also a transverse mode of that multi-core fiber taken as a whole.

In one embodiment, optical add/drop multiplexer 130 is a reconfigurable add/drop multiplexer. Since link 120 is typically characterized by a relatively high degree of inter-mode mixing, node 110 generally needs to receive all transverse modes having the same optical frequency (wavelength) to properly process a TMM signal and recover the data carried by that signal. Consequently, multiplexer 130 is designed to (i) drop from incoming link 120 all transverse modes having the same optical frequency and/or (ii) add to outgoing link 120 all populated transverse modes having the same optical frequency. In other words, multiplexer 130 implements a conventional WDM add/drop functionality, but acts on a TMM multiplex of each particular wavelength as a whole.

To support the intended functions, multiplexer 130 employs narrow-band, interleaver-type optical filters that have substantially identical transmission characteristics for all transverse modes. In addition, multiplexer 130 has a relatively low level of WDM crosstalk (i.e., crosstalk between different optical frequencies of the WDM multiplex). The latter characteristic can be achieved, e.g., by: (i) performing the requisite optical filtering in the single-mode domain prior to a mode-coupling module (see, e.g., FIG. 8); (ii) using a sinc-type waveform shaping; and/or (iii) using orthogonal frequency-division multiplexing (OFDM).

If system 100 employs multi-core fibers in links 120, then multiplexer 130 can be designed to treat a selected set of cores (which can be all cores of the multi-core fiber or any subset thereof) as a single entity, thereby adding a wavelength channel to and/or dropping the wavelength channel from the whole set at the same time. If link 120 has a relatively low level of crosstalk between different cores, then multiplexer 130 can be designed to add communication signals to and/or drop communication signals from respective individual cores while treating inter-core crosstalk as noise/impairment.

In various embodiments, optical amplifier 140 can be a lumped amplifier or a distributed amplifier. In general, system 100 can be designed to preserve the unitary nature of the mode-mixing matrix throughout the entire link between two communicating nodes 110. Consequently, optical amplifier 140 is designed to exhibit substantially the same gain for all transverse modes of link 120.

In one embodiment, optical amplifier 140 is a relatively long fiber amplifier (e.g., longer than about 100 m) having (i) a plurality of active sections and (ii) a plurality of mode scramblers interposed between the active sections. Each active section provides a moderate gain (e.g., between about 1 dB and about 5 dB). A mode scrambler (a.k.a. mode mixer) is an optical device that induces relatively large mode coupling between different transverse modes. Ideally, a mode scrambler generates a statistically uniform mode mix at the output, which mode mix is substantially independent of the modal distribution received by the mode scrambler at the input. One skilled in the art will appreciate that the combination of moderate gain in each active section and relatively frequent mode scrambling ensures that all transverse modes applied to amplifier 140 are subjected to substantially the same amount of amplification.

In one embodiment, optical cross-connect 150 is reconfigurable to enable desired routing of optical signals between different nodes 110. As already mentioned above, to properly decode an individual, independently modulated component of a TMM multiplex, node 110 generally needs to receive the whole TMM multiplex. Accordingly, cross-connect 150 is designed to act on the TMM multiplex corresponding to each wavelength as a whole while performing its WDM-routing function. One skilled in the art will appreciate that cross-connect 150 can generally be implemented with many of the same components as multiplexer 130.

Illustratively, system 100 is shown in FIG. 1 as having four nodes 110, one optical add/drop multiplexer 130, one optical amplifier 140, and one optical cross-connect 150. One skilled in the art will understand that, in other embodiments, system 100 might have different numbers of nodes 110, optical add/drop multiplexers 130, optical amplifiers 140, and/or optical cross-connects 150. One skilled in the art will further understand that these elements can generally be arranged and interconnected in a manner different from that shown in FIG. 1.

Optical Fiber

FIGS. 2A-H show (not to scale) cross-sectional views of optical fibers that can be used in system 100 according to various embodiments of the invention. More specifically, the various fibers shown in FIGS. 2A-H can be used in nodes 110, optical communication links 120, optical add/drop multiplexers 130, optical amplifiers 140, and/or optical cross-connects 150.

Figure 2A:
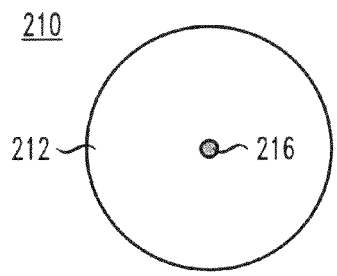
FIGS. 2A-H show cross-sectional views of optical fibers that can be used in the system of FIG. 1 according to various embodiments of the invention.

FIG. 2A shows a cross-sectional view of a single-mode fiber 210. Fiber 210 has a cladding 212 and a core 216. Core 216 has a relatively small diameter, which causes fiber 210 to support a single transverse mode for each wavelength from the range of wavelengths employed in system 100.

Figure 2B:
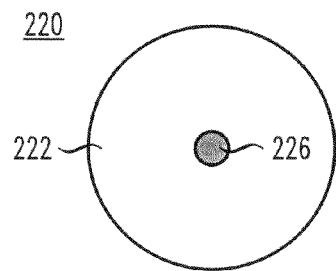

FIG. 2B shows a cross-sectional view of a multimode fiber 220. Fiber 220 has a cladding 222 and a core 226. Fiber 220 differs from fiber 210 in that core 226 has a larger diameter than core 216. In various embodiments, the diameter of core 226 is chosen to enable fiber 220 to support a desired number of transverse modes selected from a range between two and about one hundred.

Figure 2C:
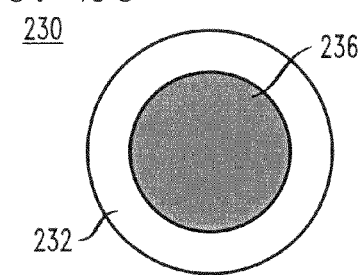

FIG. 2C shows a cross-sectional view of a multimode fiber 230. Fiber 230 has a cladding 232 and a core 236. Core 236 has an even larger diameter than core 226, which enables fiber 230 to support more than about one hundred transverse modes.

Figure 2D:
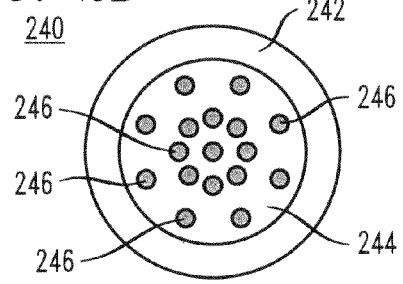

FIG. 2D shows a cross-sectional view of a multi-core fiber 240. Fiber 240 has a first (outer) cladding 242 and a second (inner) cladding 244. Fiber 240 further has a plurality of cores 246 enclosed within inner cladding 244. The diameter of each core 246 can be chosen to cause the core to support either a single transverse mode or multiple transverse modes.

In one embodiment, fiber 240 is designed for use in optical amplifier 140. More specifically, inner cladding 244 and/or cores 246 are doped (e.g., with erbium ions) to provide an optically active medium. Optical pumps of amplifier 140 (not explicitly shown in FIG. 1) inject optical pump waves into inner cladding 244, which, due to its index-of-refraction contrast with outer cladding 242, is able to guide those optical pump waves along the longitudinal axis of fiber 240. The guided optical pump waves couple from inner cladding 244 into individual cores 246, thereby providing a source of energy for the amplification of optical signals guided by the cores. Inner cladding 244 has a diameter that causes this cladding to function as a multimode core for the optical pump waves, which ensures that the pump energy is distributed substantially uniformly among cores 246.

Figure 2E:
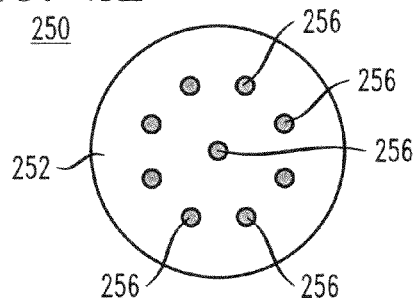

FIG. 2E shows a cross-sectional view of a multi-core fiber 250. Fiber 250 has a cladding 252 and a plurality of cores 256. Cores 256 are distributed within cladding 252 so that there is a relatively large separation between the cores. Due to the relatively large separation, the amount of inter-core crosstalk in fiber 250 is relatively small, which enables individual cores 256 to function as separate and independent conduits for optical communication signals. In various embodiments, each individual core 256 can be designed to support either a single transverse mode or multiple transverse modes.

Figure 2F:
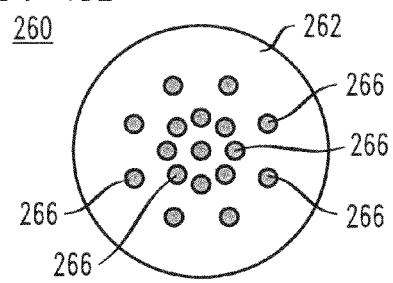

FIG. 2F shows a cross-sectional view of a multi-core fiber 260. Fiber 260 has a cladding 262 and a plurality of cores 266. Cores 266 are distributed within cladding 262 so that the separation between the cores is: (i) sufficiently small to produce a moderate amount of linear coupling between the cores and (ii) yet sufficiently large to produce a relatively small amount of nonlinear coupling between the cores. If each of cores 266 supports a respective single transverse mode, then these properties of fiber 260 can be used to create a relatively small number of well-defined and spatially separated transverse modes for the fiber as a whole.

Figure 2G:
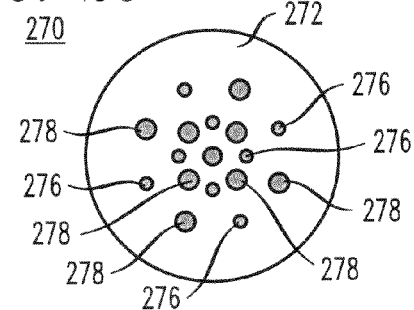

FIG. 2G shows a cross-sectional view of a multi-core fiber 270. Fiber 270 has a cladding 272, a first plurality of cores 276, and a second plurality of cores 278. Cores 276 have a smaller diameter than cores 278. The separation between the various cores in fiber 270 is similar to the separation used in fiber 260 (FIG. 2F).

One reason for having two different core types in fiber 270 is to create two types of transverse modes characterized by different propagation constants. A mismatch in the propagation constants results in a group-velocity difference, which is generally beneficial for reducing the detrimental effects of fiber nonlinearity. For example, a detrimental impact of cross-phase modulation can be significantly reduced for signals from different WDM channels when those channels have a relatively large group-velocity mismatch. In one embodiment, cores 276 and 278 are distributed throughout cladding 272 to achieve maximum spatial separation between the cores of the same type.

Figure 2H:
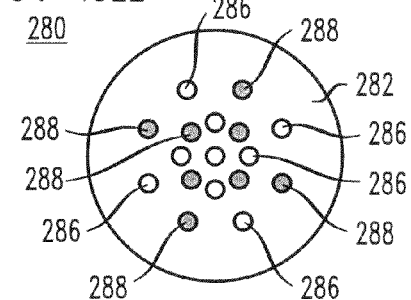

FIG. 2H shows a cross-sectional view of a multi-core fiber 280. Fiber 280 has a cladding 282, a first plurality of cores 286, and a second plurality of cores 288. Although cores 286 and 288 have the same diameter, they are made of materials having different indices of refraction. The index-of-refraction difference causes cores 286 and 288 to have different propagation constants, which enables fiber 280 to reduce the detrimental effects of fiber nonlinearity via a mechanism that is qualitatively similar to the mechanism effective in fiber 270 (FIG. 2G).

One skilled in the art will understand that, in addition to the fibers shown in FIGS. 2A-H, other types of fiber are also possible. For example, a multi-core fiber having cores of two or more different sizes that are made of two or more different materials can be fabricated to implement the features shown in both FIGS. 2G and 2H.

In one embodiment of system 100, link 120 is implemented, e.g., using one of the fibers shown in FIG. 2, so that all relevant transverse modes have approximately the same propagation speed and very similar chromatic-dispersion (CD) characteristics. More specifically, dispersion properties of different transverse modes can be analyzed using a b-v diagram, in which b is the normalized propagation constant and v is the normalized optical frequency. A representative b-v diagram and explanation of parameters b and v can be found, e.g., in the article by D. Gloge entitled "Weakly Guiding Fibers," published in Applied Optics, 1971, vol. 10, No. 10, pp. 2252-2258, which article is incorporated herein by reference in its entirety. Briefly, for a given operating frequency $v_0$, the slope of a modal dispersion curve corresponds to the group velocity of the mode, and the curvature of the dispersion curve corresponds to the chromatic dispersion of the mode.

To properly invert the mode-mixing matrix corresponding to link 120, a receiver employed in node 110 might need filters/buffers having a relatively large capacity, e.g., sufficient to cover the temporal depth equal to the sum of (i) the maximum spread induced by the effects of chromatic dispersion in link 120 and (ii) the maximum differential modal delay (DMD) accrued in the link by different modes. Ideally, one would want some amount of CD for each of the transverse modes for the same nonlinearity reasons one wants some amount of CD in a single-mode fiber. Then, configuring link 120 so that all relevant transverse modes have approximately the same propagation speed and similar CD characteristics helps to avoid excessive digital processing depth. As a counterexample, let us assume a 10-Gbaud system (e.g., 100G per mode). For an intra-modal CD of 20 ps/(km nm) and a link having a length of about 2,000 km, the receiver might need approximately 60 adaptive T-spaced filter taps. If the differential delay is about 10%, then the DMD can be as large as approximately 1 ms, while a significantly smaller processing depth is preferable.

As used herein, the term "multi-path fiber" encompasses both multimode fibers (e.g., fibers 220 and 230, FIGS. 2B-C) and multi-core fibers (e.g., fibers 240-280, FIGS. 2D-H).

Optical Transmitter

Figure 3A:
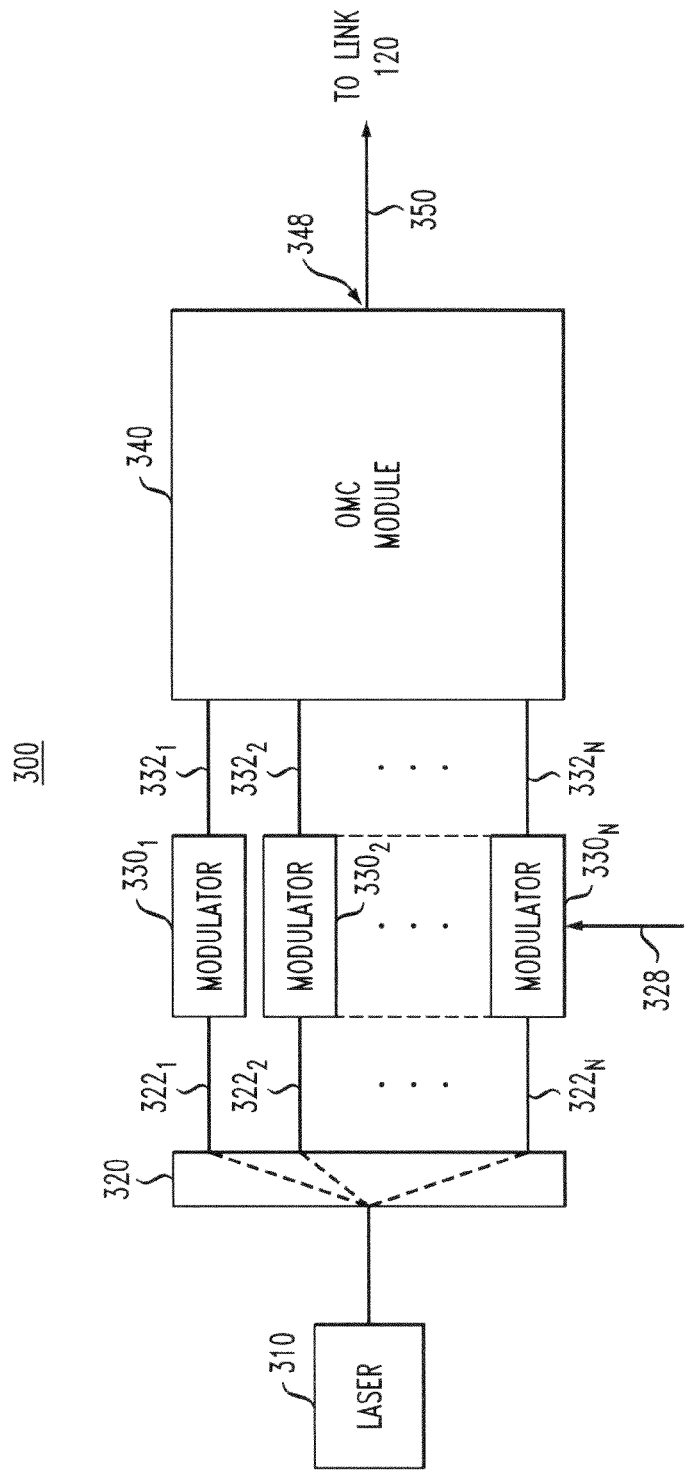

FIGS. 3A-B illustrate an optical transmitter 300 that can be used in node 110 (FIG. 1) according to one embodiment of the invention. More specifically, FIG. 3A shows a block diagram of transmitter 300. FIG. 3B graphically illustrates the operation of an optical mode-coupling (OMC) module 340 used in transmitter 300.

FIG. 3A illustratively shows transmitter 300 as being coupled to communication link 120 via an output fiber 350. Fiber 350 is generally of the same type as the fiber used in the immediately adjacent section of communication link 120. As already explained above, communication link 120 can be implemented using any suitable types of fiber, such as those shown in FIG. 2. The description that follows is exemplary and corresponds to an embodiment in which output fiber 350 is similar to fiber 220 (see FIG. 2B). Based on this description, one skilled in the art will understand how to design other embodiments of transmitter 300 suitable for coupling optical communication signals into other types of fiber.

Transmitter 300 has a laser 310 configured to generate an output light beam of a designated wavelength. A beam splitter 320 spits the beam generated by laser 310 N ways and couples the resulting N beams into N single-mode fibers 322, where N is an integer greater than one. Each fiber 322 directs its respective beam to a corresponding optical modulator 330, where that beam is modulated with data supplied to the modulator via a control signal 328. Note that different modulators 330 or suitable modulator arrangements can modulate their respective optical beams using different independent or correlated data streams derived from control signal 328. In a representative configuration, each modulator 330 modulates its optical beam based on a corresponding independent data stream intended for transmission from transmitter 300 to a remote receiver. The modulated optical signals produced by modulators 330 ultimately serve as independently modulated components of a TMM signal that is applied by OMC module 340 to fiber 350.

In an alternative embodiment, laser 310 can be directly coupled to modulators 330 or coupled to the modulators not through fibers, but through free space.

One function of OMC module 340 is to properly couple the N modulated optical signals received via N single-mode fibers 332 into fiber 350. More specifically, each modulated optical signal received by OMC module 340 is coupled substantially into a single selected transverse mode of fiber 350, with different modulated optical signals being coupled into different transverse modes. As used herein, the phrase "to couple a signal substantially into a single transverse mode" can have two possible, but not mutually exclusive, meanings. According to the first meaning, this phrase means that at least about 50% (and perhaps more than about 80% or 90%) of the total energy of the signal couples into one selected transverse mode. According to the second meaning, this phrase means that, for the portion of the total energy of the signal that is coupled into the multimode fiber, at least about 50% (and perhaps more than about 80% or 90%) of that portion goes into one selected transverse mode, while the remainder of that portion goes into other transverse modes. When an individual optical signal is coupled (e.g., by OMC module 340) substantially into a single transverse mode of the multimode fiber (e.g., fiber 350) at a proximate terminus of that fiber and is thereby transformed into an optical component of a TMM signal that is launched into the multimode fiber, it is said that that optical component of the TMM signal "corresponds to a single transverse mode of the multimode fiber at the proximate terminus of the multimode fiber."

In one embodiment of transmitter 300, the number N is chosen to be the same as the total number of transverse modes supported by fiber 350. In other words, this embodiment of transmitter 300 employs OMC module 340 that is capable of populating each and every of the transverse modes of multimode fiber 350 with a respective independently modulated optical signal.

FIG. 3B graphically depicts the optical beam shaping performed by OMC module 340. More specifically, different panels of FIG. 3B show various phase/field-strength (PFS) patterns that can be produced by OMC module 340 at a terminus 348 of fiber 350, with different panels corresponding to different optical channels of the OMC module. Each PFS pattern is represented in FIG. 3B using a color scheme in which: (i) the degree of color saturation represents the optical-field strength and (ii) the color itself represents the phase of the optical field. For example, the light red color corresponds to lower optical-field strength than the dark red color. A rainbow-like change in color from blue to red represents a continuous change in the phase from $-\pi$ to $+\pi$.

For each optical channel of OMC module 340, the PFS pattern produced by that channel at terminus 348 of fiber 350 substantially matches the PFS pattern of the transverse mode assigned to that channel. One skilled in the art will understand that the above-indicated mode-coupling loss might be caused by a mismatch between these PFS patterns. The light energy corresponding to the mode-coupling loss might be parasitically coupled into other transverse modes of fiber 350 and/or be altogether rejected by the fiber.

As used herein, the term "substantially matches" means that the difference between the PFS pattern generated by the optical channel and the PFS pattern of the corresponding transverse mode is relatively small and satisfies at least one of two possible, but not mutually exclusive, criteria. According to the first criterion, the difference is so small that at least about 50% (and perhaps more than about 80% or 90%) of the total energy of the PFS pattern generated by the optical channel couples into the corresponding transverse mode. According to the second criterion, the difference is so small that, for the portion of the total energy of the PFS pattern generated by the optical channel that is coupled into the multimode fiber, at least about 50% (and perhaps more than about 80% or 90%) of that portion goes into the corresponding transverse mode, while the remainder of that portion goes into other transverse modes.

Different transverse modes corresponding to different PFS patterns of FIG. 3B are labeled using the following notation. The letters "LP" stand for "linearly polarized." The numbers that follow the "LP" in the label give, in the designated order, the values of two quantized parameters. For each transverse mode, the first quantized parameter gives the number of $2\pi$-sized phase increments per one azimuthal rotation about the fiber axis, and the second quantized parameter gives the number of $\pi$-sized phase increments over the fiber radius. For example, the transverse mode designated as LP01 has (i) no azimuthal phase increments and (ii) one radial phase increment. Similarly, the transverse mode designated as LP32 has (i) three azimuthal phase increments and (ii) two radial phase increments.

If OMC module 340 has eight optical channels, then the following representative mode assignment can be used: (Ch.1)-LP01; (Ch.2)-LP11; (Ch.3)-LP21; (Ch.4)-LP02; (Ch.5)-LP31; (Ch.6)-LP12; (Ch.7)-LP41; and (Ch.8)-LP22. On skilled in the art will understand that other mode assignments, according to which each optical channel of OMC module 340 is configured to produce a PFS pattern that substantially matches the PFS pattern of the assigned transverse mode of fiber 350, can similarly be used without departing from the scope and principle of the invention.

One skilled in the art will understand that FIG. 3B corresponds to one possible transverse-mode basis set, and that other basis sets, each comprising a plurality of mutually orthogonal transverse modes can similarly be used to implement OMC module 340.

Figure 4B:
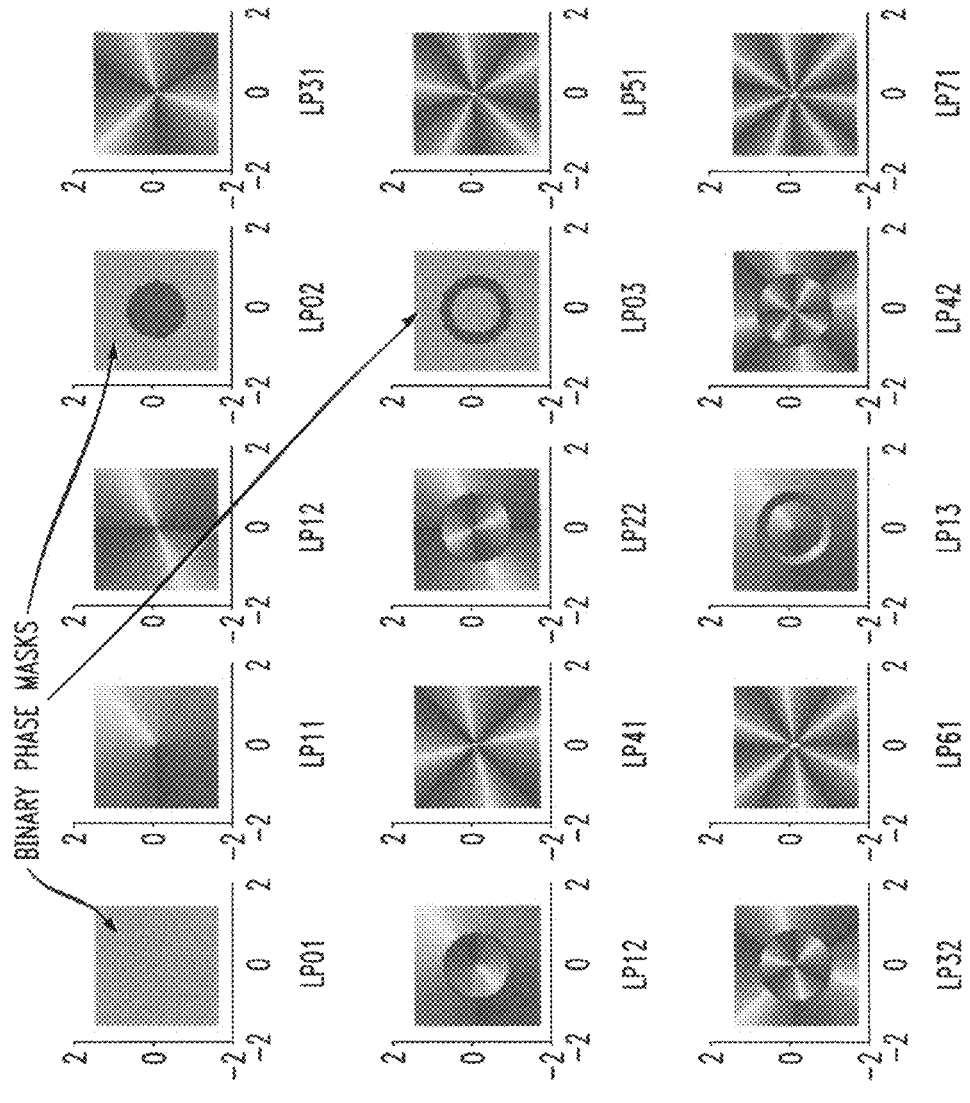

FIGS. 4A-B illustrate an OMC module 400 that can be used as OMC module 340 (FIG. 3) according to one embodiment of the invention. More specifically, FIG. 4A shows a block diagram of OMC module 400. FIG. 4B shows phase masks 420 that can be used in OMC module 400.

OMC module 400 has two optical channels and, as such, is shown as being coupled to two input fibers 332 (see also FIG. 3A). One skilled in the art will understand that OMC module 400 can be modified in a straightforward manner to have three or more optical channels. More specifically, a new optical channel can be created by adding a set of optical elements similar to that used to form Channel 2 in OMC module 400.

OMC module 400 has two lenses 410, each of which collimates a respective diverging light beam applied to the OMC module by a respective one of fibers 332. Each of the resulting collimated beams passes through a respective one of phase masks 420 to create a corresponding phase-filtered beam 422. A plurality of mirrors 430 then spatially superimpose the two phase-filtered beams 422 and direct a resulting "superimposed" beam 432 toward fiber 350. Note that mirror $430_4$ is a partially transparent mirror, while mirrors $430_1$-$430_3$ are regular non-transparent mirrors. Two lenses 442 and 446 and an aperture 444 are used to compress (i.e., reduce the size of) and spatially filter beam 432 to produce an output beam 452 that impinges on terminus 348 of fiber 350 and creates an intended superposition of the PFS patterns shown in FIG. 3B.

Depending on the transverse modes assigned to the two optical channels of OMC module 400, phase masks $420_1$ and $420_2$ are appropriately chosen, e.g., from the assortment of phase masks shown in FIG. 4B. For example, if a particular optical channel of OMC module 400 is assigned the LP11 mode of fiber 350, then the phase mask labeled LP11 in FIG. 4B is used as phase mask 420 in that optical channel. Similarly, if a particular optical channel of OMC module 400 is assigned the LP21 mode of fiber 350, then the phase mask labeled LP21 in FIG. 4B is used as phase mask 420 in that optical channel, and so on. The combined effect of phase filtering imposed by phase mask 420 and spatial filtering imposed by aperture 444 is that the optical channel creates at terminus 348 of fiber 350 an intended one of the PFS patterns shown in FIG. 3B, thereby efficiently coupling the optical signal from the optical channel into the corresponding transverse mode of the fiber.

Note that some of the phase masks shown in FIG. 4B are binary phase masks (i.e., phase masks that can locally impose only one of two possible phase shifts, e.g., either 0 or $\pi$). In particular, phase masks corresponding to the LP01, LP02, and LP03 modes are binary phase masks. The remaining phase masks shown in FIG. 4B are "analog" phase masks because different portions of the phase mask can impose phase shifts selected from a continuous phase-shift range. Analog phase masks are shown in FIG. 4B using a color scheme, in which: (i) different colors represent different phase shifts in a continuous $2\pi$ interval and (ii) different bands of the same color might represent phase shifts that differ from each other by an integer multiple of $2\pi$.

In one embodiment, OMC module 400 might employ a single, relatively large, continuous phase mask in place of two separate phase masks $420_1$ and $420_2$. This relatively large, continuous phase mask, hereafter termed "a multi-sectional phase mask," might contain, in its different sections (portions), two or more phase masks from FIG. 4B. These sections of the multi-sectional phase mask are arranged so that one section serves as phase mask $420_1$ and another section serves as phase mask $420_2$.

Figure 5:
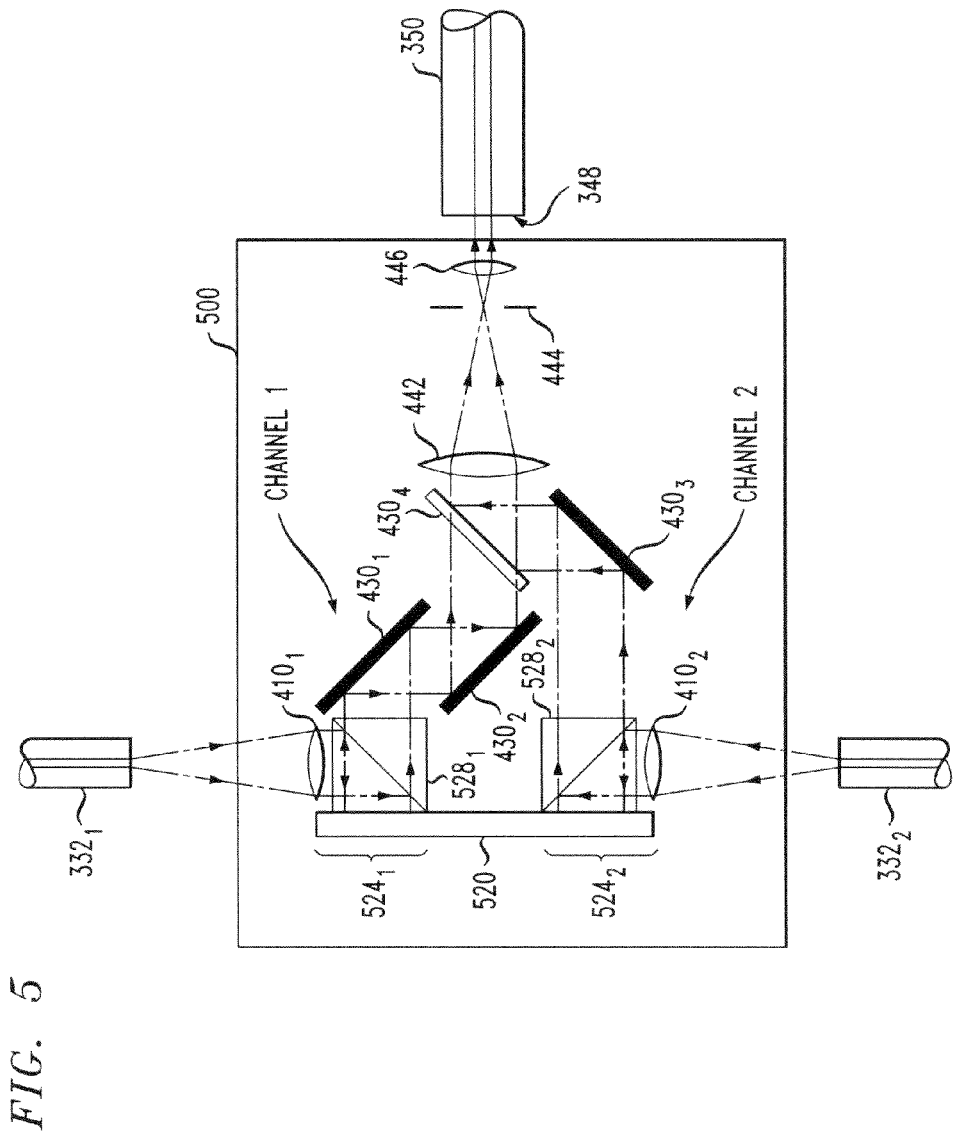
FIG. 5 shows a block diagram of an OMC module that can be used in the transmitter of FIG. 3 according to another embodiment of the invention.

FIG. 5 shows a block diagram of an OMC module 500 that can be used as OMC module 340 (FIG. 3) according to another embodiment of the invention. OMC module 500 is generally analogous to OMC module 400 (FIG. 4) and uses many of the same elements, such as lenses 410, 442, and 446, mirrors 430, and aperture 444. The description of these elements is not repeated here. Instead, the description of OMC module 500 that follows focuses on differences between OMC modules 400 and 500.

One difference between OMC modules 400 and 500 is that the latter employs a spatial light modulator (SLM) 520 instead of phase masks 420. In one embodiment, SLM 520 is a liquid-crystal-on-silicon (LCOS) SLM. A representative LCOS SLM that can be used as SLM 520 is described, e.g., in "Polarization Engineering for LCD Projection," by M. G. Robinson, J. Chen, G. D. Sharp, Wiley, Chichester (England), 2005, Chapter 11, pages 257-275, the teachings of which are incorporated herein by reference in their entirety. LCOS SLMs that can be adapted for use as SLM 520 are also disclosed, e.g., in U.S. Pat. Nos. 7,268,852, 6,940,577, and 6,797,983, all of which are incorporated herein by reference in their entirety. A suitable LCOS SLM that can be used as SLM 520 is manufactured by JVC Corporation and is commercially available as part of JVC Projector Model DLA-HD2K.

SLM 520 has two areas $524_1$ and $524_2$ configured to perform the requisite phase filtering for Channel 1 and Channel 2, respectively, of OMC module 500. More specifically, area $524_1$ is configured to display a spatial-modulation pattern that produces phase filtering similar to that of phase mask $420_1$ (see FIG. 4A). Similarly, area $524_2$ is configured to display a spatial-modulation pattern that produces phase filtering similar to that of phase mask $420_2$ (also see FIG. 4A).

Since SLM 520 is a reconfigurable device, it can be used to dynamically change or adjust the patterns displayed in its various areas, e.g., areas $524_1$ and $524_2$. This feature can be useful, e.g., to enable a relatively easy change in the transverse-mode assignment for different optical channels of OMC module 500 and/or to maintain optimal optical coupling for different optical channels of the OMC module under changing operating conditions that might cause corresponding changes in the relevant characteristics of multimode fiber 350.

OMC module 500 uses two polarization beam splitters 528 to appropriately direct the collimated beams produced by lenses 410 toward SLM 520 and the phase-filtered beams produced by the SLM toward mirrors 430. In one embodiment, a quarter-wave plate (not explicitly shown in FIG. 5) can be inserted between polarization beam splitter 528 and SLM 500 to appropriately rotate the polarization of the beam transmitted through that plate to enable the polarization beam splitter to direct the collimated beam toward the SLM while directing the phase-filtered beam toward mirrors 430. In an alternative embodiment, SLM 500 can be designed to rotate the polarization of the reflected light to enable polarization beam splitters 528 to do the same beam routing.

In one embodiment, OMC module 500 can be used to produce a TMM signal that is also polarization multiplexed. In particular, if SLM 520 itself is substantially polarization insensitive, then the same SLM can be used to process both polarizations used for polarization multiplexing.

Figure 6:
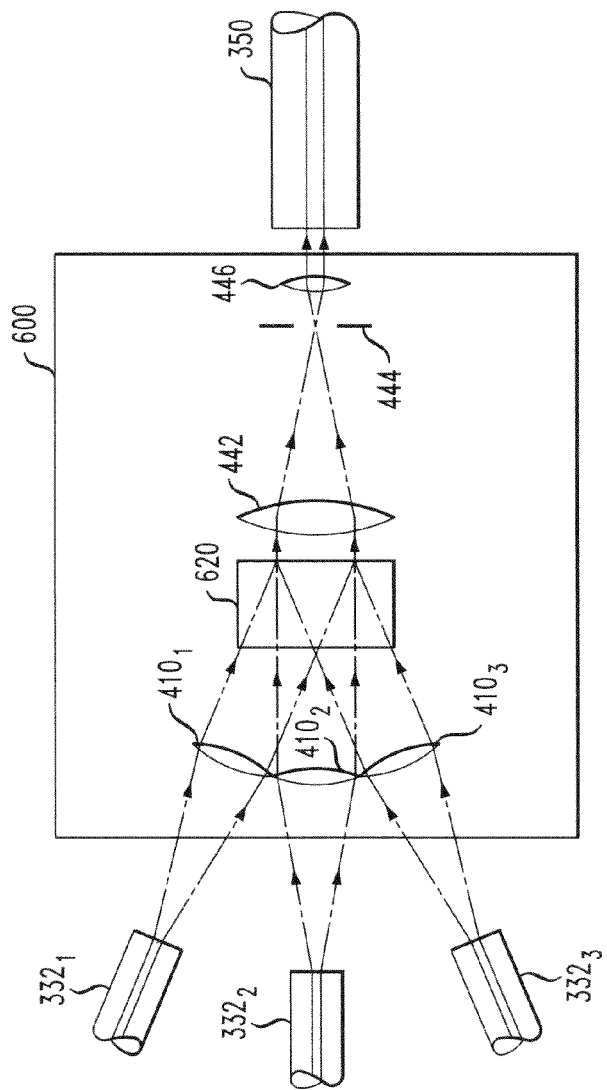
FIG. 6 shows a block diagram of an OMC module that can be used in the transmitter of FIG. 3 according to yet another embodiment of the invention.

FIG. 6 shows a block diagram of an OMC module 600 that can be used as OMC module 340 (FIG. 3) according to yet another embodiment of the invention. OMC module 600 is generally functionally analogous to OMC modules 400 and 500 (FIGS. 4 and 5). However, OMC module 600 differs from OMC modules 400 and 500 in that it employs a volume hologram 620, which can generally be viewed as a three-dimensional phase mask. Note that, in contrast to volume hologram 620, phase mask 420 and SLM 520 can generally be viewed as thin-film or two-dimensional phase masks.

In OMC module 600, volume hologram 620 performs at least two different functions. The first of these functions is a phase-filtering function similar to that of phase masks 420 in OMC module 400 and of SLM 520 in OMC module 500. The second of these functions is a beam-combining function similar to that of mirrors 430. Volume hologram 620 is capable of applying the requisite different phase filtering to different optical signals received from fibers 332 because the corresponding optical beams traverse different sub-volumes of the volume hologram. Also for this reason, volume hologram 620 is capable of changing the propagation direction for different optical signals by different amounts. Volume holograms are known in the art and are described in more detail, e.g., in U.S. Pat. Nos. 7,416,818, 7,323,275, and 6,909,528, all of which are incorporated herein by reference in their entirety.

OMC module 600 is illustratively shown as having three optical channels. One skilled in the art will understand that OMC module 600 can be modified in a straightforward manner to have a different number of optical channels.

Figure 7:
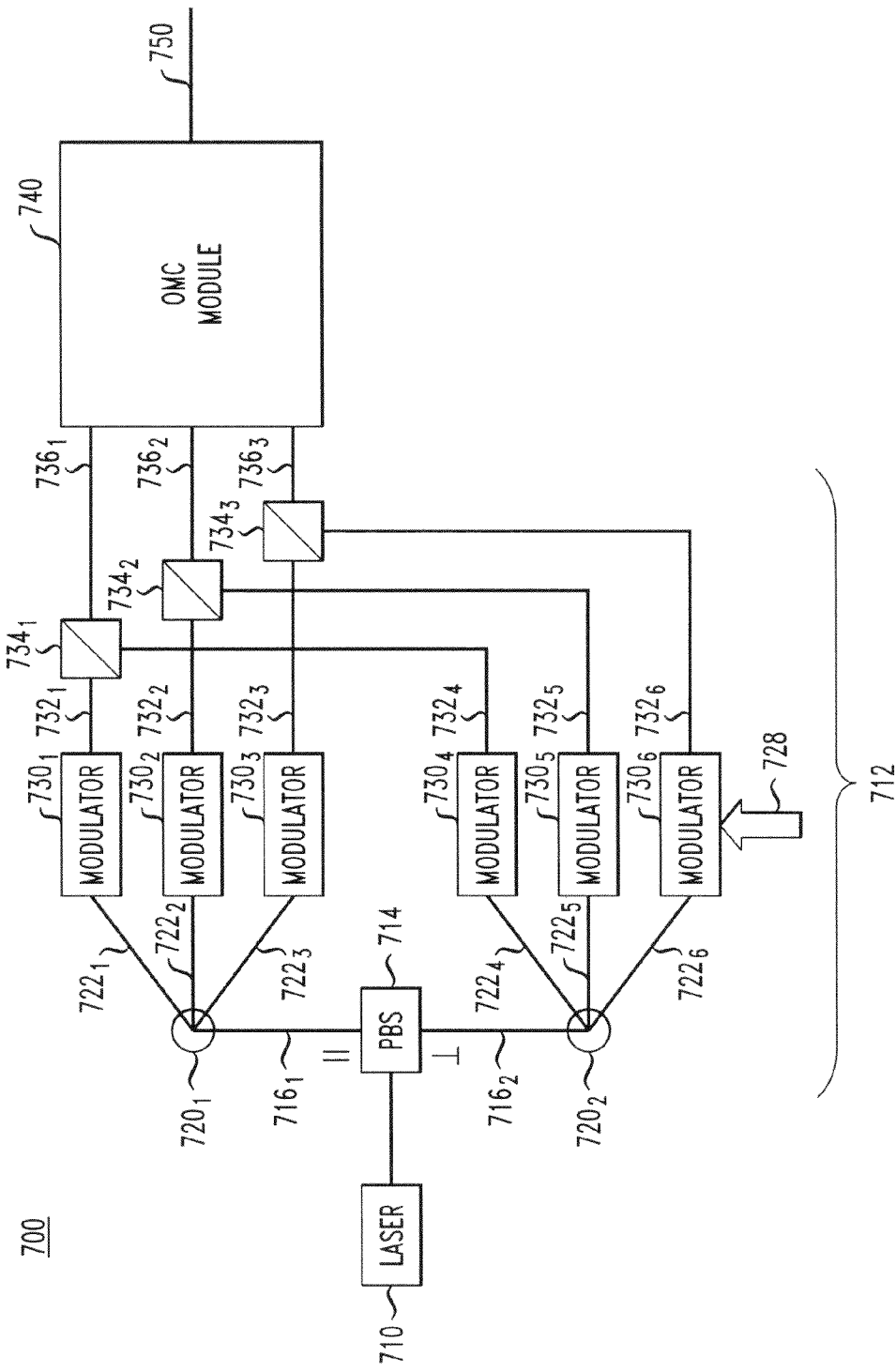
FIG. 7 shows a block diagram of an optical transmitter that can be used in a node of the system shown in FIG. 1 according to another embodiment of the invention.

FIG. 7 shows a block diagram of an optical transmitter 700 that can be used in node 110 (FIG. 1) according to another embodiment of the invention. Similar to transmitter 300 (FIG. 3), transmitter 700 has the capability of selectively coupling independently modulated optical signals into respective transverse modes of an output fiber (i.e., fiber 750). However, additionally, transmitter 700 has polarization-multiplexing (PM) capabilities enabled by the use, in a modulation and polarization-multiplexing (MPM) module 712 of the transmitter, of a polarization beam splitter 714 and polarization combiners 734. Transmitter 700 is illustratively shown as having three optical channels per polarization. One skilled in the art will understand that transmitter 700 can be modified in a straightforward manner to have a different number of channels per polarization (e.g., two or more than three).

Transmitter 700 has a laser 710 configured to generate an output light beam of a designated wavelength. Laser 710 feeds MPM module 712, in which polarization beam splitter 714 spits the beam generated by the laser into beams $716_1$ and $716_2$ having mutually orthogonal polarizations. MPM module 712 further has two power splitters 720, each of which splits the respective polarized beam received from polarization beam splitter 714 three ways and couples the resulting three beams into three single-mode fibers 722. Each fiber 722 directs its respective beam to the corresponding optical modulator 730, where that beam is modulated with data supplied to the modulator via a control signal 728. The modulated optical signals produced by modulators 730 are coupled into single-mode fibers 732 and directed to the corresponding polarization combiner 734. Each polarization combiner 734 combines the two received orthogonally polarized signals into a corresponding PM signal and then directs that PM signal, via a respective single-mode fiber 736, to an OMC module 740.

In an alternative embodiment, transmitter 700 can use direct optical coupling or through-free-space optical coupling instead of or in addition to at least some of the fiber coupling shown in FIG. 7.

OMC module 740 of transmitter 700 is generally analogous to OMC module 340 of transmitter 300 (FIG. 3) and serves to properly couple the three received PM signals into fiber 750. More specifically, each PM signal received by OMC module 740 is coupled into a selected transverse mode of fiber 750, with different PM signals being coupled into different transverse modes. For an individual PM signal (which has two orthogonally polarized components), each of its polarization components is subjected to substantially the same phase filtering in OMC module 740. In various embodiments, OMC module 740 can be implemented similar to OMC modules 400, 500, and 600 (see FIGS. 4-6). However, in designing OMC module 740, special attention is given to its polarization-handling characteristics to enable said OMC module to be substantially polarization insensitive.

Figure 8:
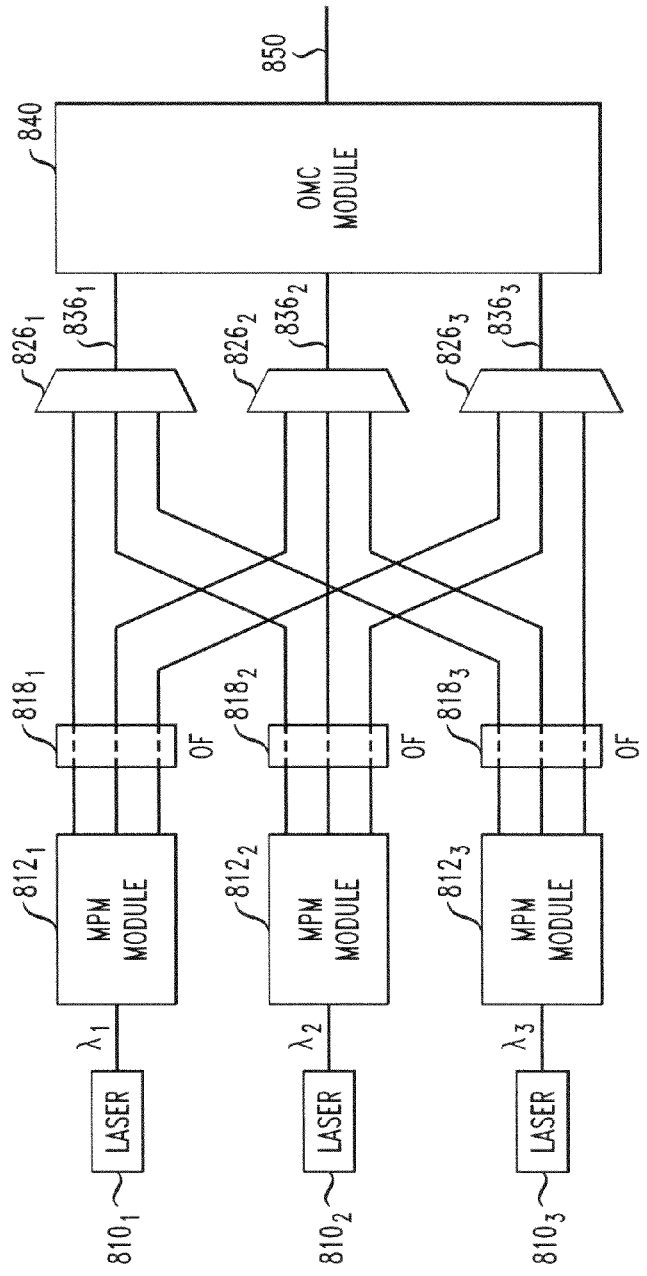
FIG. 8 shows a block diagram of an optical transmitter that can be used in a node of the system shown in FIG. 1 according to yet another embodiment of the invention.

FIG. 8 shows a block diagram of an optical transmitter 800 that can be used in node 110 (FIG. 1) according to yet another embodiment of the invention. Similar to each of transmitters 300 and 700 (see FIGS. 3 and 7), transmitter 800 has the capability of selectively coupling optical communication signals into various transverse modes of an output fiber (i.e., fiber 850). Similar to transmitter 700, transmitter 800 has polarization-multiplexing capabilities enabled by the use of three MPM modules 812, each of which is analogous to MPM module 712 (see FIG. 7). However, additionally, transmitter 800 has WDM capabilities. Thus, transmitter 800 uses three different types of multiplexing: transverse-mode multiplexing (TMM), polarization multiplexing (PM), and wavelength-division multiplexing (WDM).

Transmitter 800 has three TMM channels, three WDM channels, and two PM channels, which enables the transmitter to generate a TMM signal having up to eighteen independently modulated optical communication signals (up to six per excited transverse mode). One skilled in the art will understand that transmitter 800 can be modified in a relatively straightforward manner to be able to generate a different number of independently modulated components and couple them into selected transverse modes of fiber 850 in any desired manner.

Each WDM channel of transmitter 800 has a respective laser 810 that generates a designated wavelength and applies it to a respective MPM module 812. The three outputs of MPM module 812 are applied to an optical filter (OF) 818 that performs relatively tight bandpass filtering intended to reduce crosstalk between optical signals corresponding to different WDM channels. The filtered signals are WDM multiplexed in multiplexers 826 and the resulting WDM signals are directed, via single-mode or integrated fibers 836, to OMC module 840.

OMC module 840 of transmitter 800 is generally analogous to OMC module 340 of transmitter 300 (FIG. 3) and serves to properly couple the three received WDM signals into fiber 850. More specifically, each WDM signal received by OMC module 840 is coupled into a selected transverse mode of fiber 850, with different WDM signals being coupled into different transverse modes. Although the PFS pattern corresponding to a transverse mode of a multimode fiber depends on the wavelength, the typical spectral bands used in WDM systems are relatively narrow, which in practice enables the use of the same phase mask for all WDM channels. For example, a spectral band centered at about 1550 nm and having a total width of about 100 nm has only about 6% variance in the carrier frequency across the entire spectral band. Due to this relatively small variance, the phase mask designed for a wavelength located near the middle of the spectral band will work sufficiently well for all wavelengths in the band. Consequently, in various embodiments, OMC module 840 can be implemented similar to OMC modules 400, 500, and 600 (see FIGS. 4-6).

Optical Receiver

It is known in the art that transverse modes of a multi-path fiber undergo inter-mode mixing as they propagate along the length of the fiber. In general, the effects of inter-mode mixing are stronger in a multimode fiber. However, a multi-core fiber having relatively closely spaced cores might also exhibit relatively strong inter-mode mixing (e.g., inter-core crosstalk). As a result, even if the communication signal is coupled into a particular single transverse mode at the front end of the multi-path fiber, other transverse modes will have contributions from that communication signal at the remote end of the fiber. Hence, a significant amount of signal processing needs to be performed at the receiver to fully recover the data carried by different independently modulated components of a TMM signal. In general, to decode N independently modulated components of a TMM signal, the receiver needs to obtain at least N independent samples of the signal. The signal processing applied to these samples is generally based on matrix-diagonalization algorithms aimed at reversing the effects of inter-mode mixing in the multi-path fiber.

Figure 9:
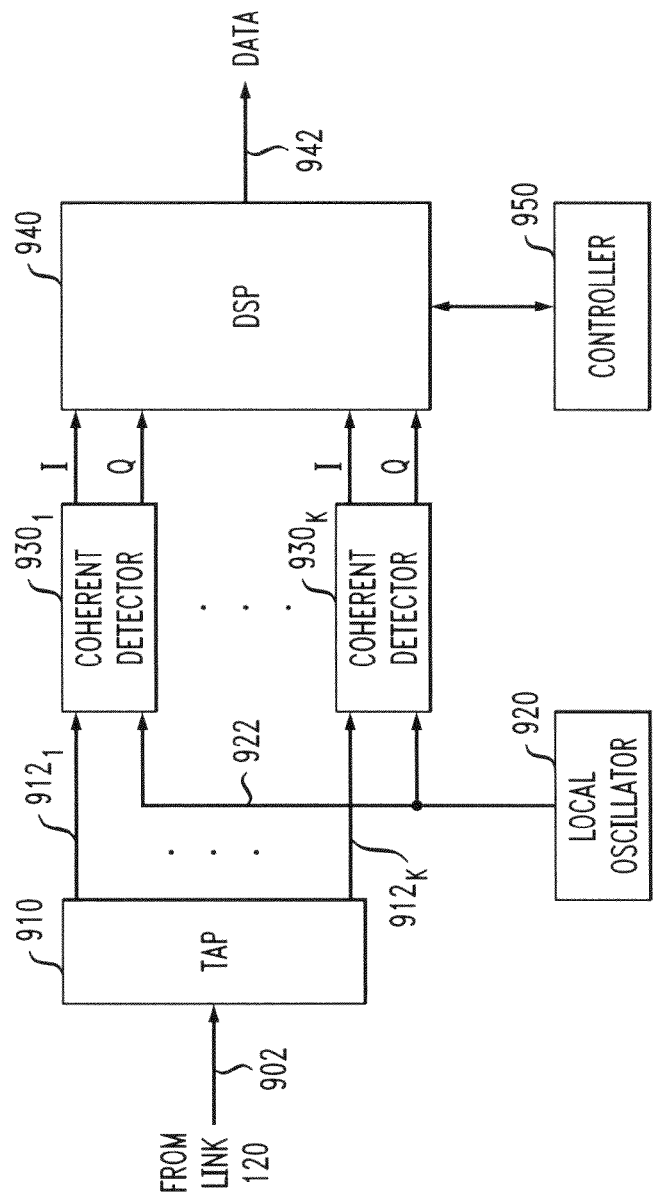
FIG. 9 shows a block diagram of an optical receiver that can be used in a node of the system shown in FIG. 1 according to one embodiment of the invention.

FIG. 9 shows a block diagram of an optical receiver 900 that can be used in node 110 (FIG. 1) according to one embodiment of the invention. Receiver 900 can be configured, e.g., to receive an input TMM signal 902 from link 120. TMM signal 902 is applied to a tap module 910 that produces K samples 912 of that TMM signal, where K is a positive integer greater than one. Each sample 912 is coherently detected by a corresponding coherent detector 930 using a local oscillator (LO) signal 922 supplied by an LO source 920. The detection results generated by coherent detector 930 from sample 912, e.g., an in-phase component I and a quadrature-phase component Q of the sample, are applied to the digital signal processor (DSP) 940. For each signaling interval (e.g., bit period), DSP 940 appropriately processes a full set of detection results generated by coherent detectors 930$_1$-930$_K$ to generate an output data stream 942. Provided that tap module 910 produces enough samples of TMM signal 902, DSP 940 is able to recover and output via stream 942 all the data that have been originally encoded by the remote transmitter onto the TMM signal that is received by receiver 900 as TMM signal 902.

One skilled in the art will understand that one function of DSP 940 is to invert the mode-mixing matrix corresponding to link 120. In general, link conditions change over time, thereby causing the mode-mixing matrix to change as well, usually on a millisecond time scale or slower. In one embodiment, DSP 940 is configured to adaptively follow link-condition variations. For example, DSP 940 can employ, as known in the art, blind adaptation algorithms to learn the link conditions and to adapt to them. Alternatively or in addition, from time to time, a controller 950 coupled to DSP 940 might request that the remote transmitter send to receiver 900 a training sequence for the DSP to obtain the current mode-mixing matrix. A representative training sequence applied by the remote transmitter to link 120 might have a TMM signal in which different transverse modes are sequentially excited in a known order so that only one transverse mode is excited at any given time. The signal processing implemented in DSP 940 might also compensate for certain nonlinear impediments, such as the phase shifts induced by self-modal and cross-modal fiber nonlinearity.

Figure 10A:
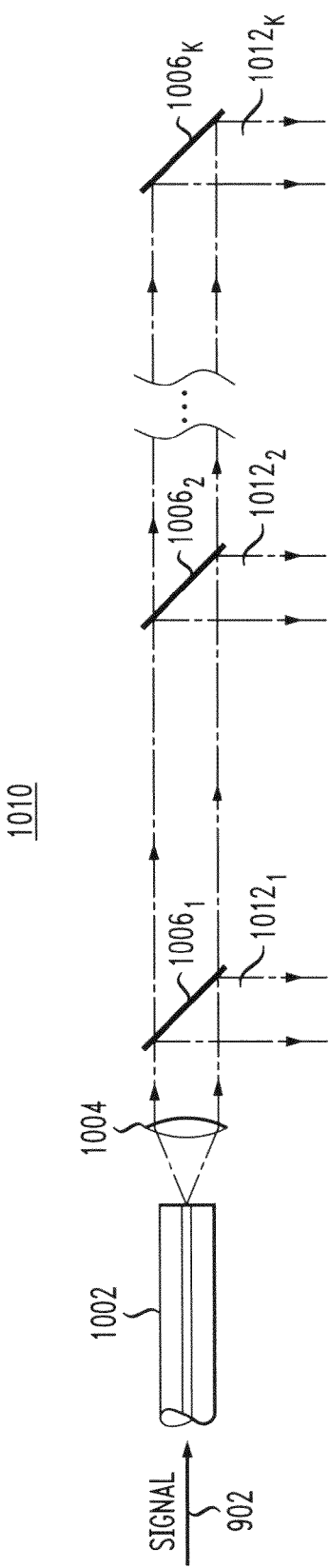
FIGS. 10A-B show a tap module and a coherent detector that can be used in the optical receiver shown in FIG. 9 according to one embodiment of the invention.
Figure 10B:
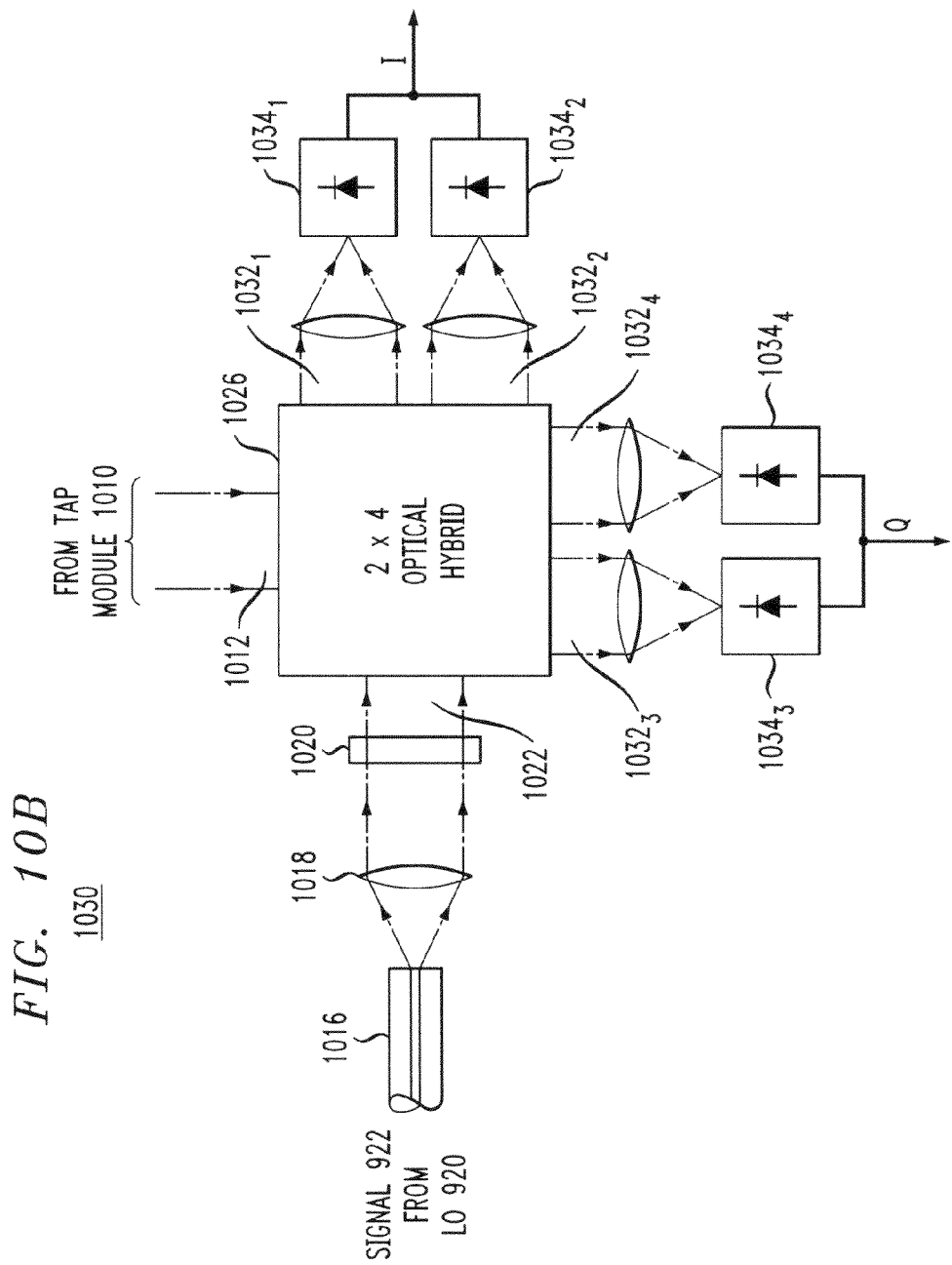

FIGS. 10A-B shows representative modules that can be used in receiver 900 (FIG. 9) according to one embodiment of the invention. More specifically, FIG. 10A shows a block diagram of a tap module 1010 that can be used as tap module 910. FIG. 10B shows a block diagram of a coherent detector 1030 that can be used as coherent detector 930.

Referring to FIG. 10A, tap module 1010 receives TMM signal 902 via a multimode fiber 1002. A collimation lens 1004 collimates the diverging light beam produced by fiber 1002 and directs the resulting collimated beam toward K−1 partially transparent mirrors 1006$_1$-1006$_{K-1}$ and a terminal non-transparent mirror 1006$_K$. In one implementation, different mirrors 1006 have a reflectivity that causes beams 1012$_1$-1012$_K$ reflected from the mirrors to have approximately the same intensity.

Referring to FIG. 10B, detector 1030 receives LO signal 922 from LO source 920 via a single-mode fiber 1016. A collimation lens 1018 collimates the diverging light beam produced by fiber 1016 and directs the resulting collimated beam toward a phase mask 1020. Phase mask 1020 is generally analogous to phase mask 420 (see FIGS. 4A-B). More specifically, phase mask 1020 produces a phase-filtered beam 1022 having a PFS pattern that is a magnified (enlarged) version of the PFS pattern corresponding to a selected transverse mode of multimode fiber 1002 (FIG. 10A). As already indicated above, FIG. 4B shows an assortment of phase masks, each of which is suitable for use as phase mask 1020. When each detector 930 in receiver 900 is implemented using detector 1030, different instances of detector 1030 in the receiver generally have different phase masks 1020 (e.g., different phase masks selected from the assortment shown in FIG. 4B). In various embodiments, these different phase masks 1020 can be implemented as different sections of a multi-sectional phase mask or using different portions of an SLM similar to SLM 520 (FIG. 5).

Phase-filtered beam 1022 and beam 1012 (that carries TMM sample 912, see FIGS. 9 and 10A) are applied to a 2×4 optical hybrid 1026, where they beat against each other to generate four interference signals 1032$_1$-1032$_4$. Each of interference signals 1032$_1$-1032$_4$ is applied to a corresponding photo-detector (e.g., photodiode) 1034 that converts it into a corresponding electrical signal. The electrical signals generated by photo-detectors 1034 are digitized and directed for further processing in DSP 940. 2×4 optical hybrids that can be used as hybrid 1026 in detector 1030 are known in the art, with representative examples being disclosed, e.g., in (i) U.S. Patent Application Publication No. 2007/0297806 and (ii) U.S. patent application Ser. No. 12/338,492, filed Dec. 18, 2008, both of which are incorporated herein by reference in their entirety.

The electric fields $E_1$-$E_4$ of interference signals $1032_1$-$1032_4$, respectively, are given by Eq. (1):

$$\begin{bmatrix} E_1 \\ E_2 \\ E_3 \\ E_4 \end{bmatrix} = \frac{1}{2} \begin{bmatrix} E_S - E_{LO} \\ -jE_S - jE_{LO} \\ -jE_S - jE_{LO}e^{j\pi/2} \\ -E_S + E_{LO}e^{j\pi/2} \end{bmatrix} \quad (1)$$

where $E_S$ and $E_{LO}$ are the electric fields of optical signals 1012 and 1022, respectively. Note that Eq. (1) holds for every point of a transverse cross-section of beam 1032. This means that detector 1030 measures not only how beams 1012 and 1022 beat against each other in time, but also how they beat against each other in space. Furthermore, due to the mutual orthogonality of different transverse modes of fiber 1016, different instances of detector 1030 having different phase masks 1020 effectively measure the electric fields corresponding to different transverse modes of TMM signal 902. One skilled in the art will understand that, if $K \geq N$, then coherent detectors 930 (or 1030) generate enough sampling data to enable DSP 940 to properly invert the mode-mixing matrix corresponding to communication link 120 and recover the data carried by the independently modulated components of the TMM signal transmitted therethrough from a remote transmitter (e.g., transmitter 300) to receiver 900.

Figure 11:
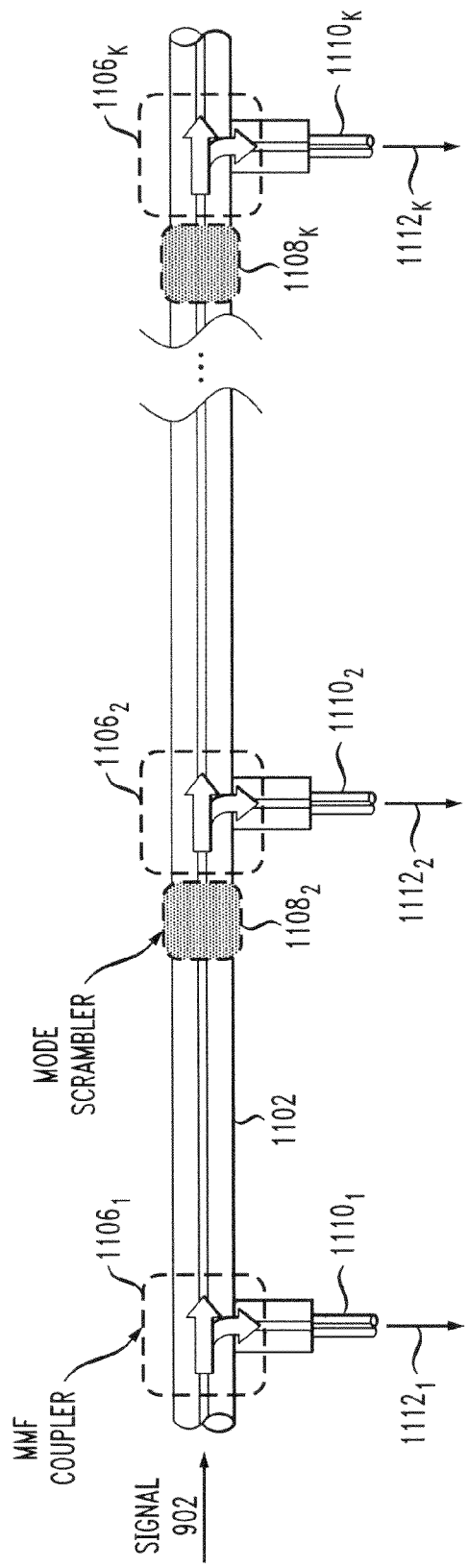
FIG. 11 show a tap module that can be used in the optical receiver shown in FIG. 9 according to another embodiment of the invention.

FIG. 11 shows a block diagram of a tap module 1110 that can be used as tap module 910 according to another embodiment of the invention. Tap module 1110 has a multimode fiber 1102 through which it receives TMM signal 902. Along the length of fiber 1102, tap module 1110 has K multimode-fiber (MMF) couplers $1106_1$-$1106_K$ and K–1 mode scramblers $1108_2$-$1108_K$. Each MMF coupler 1106 is a fiber tap that branches off a portion of TMM signal 902 and couples that portion into a corresponding single-mode fiber 1110. Signals $1112_1$-$1112_K$ carried by fibers $1110_1$-$1110_K$ serve as samples $912_1$-$912_K$, respectively, in receiver 900.

Each signal 1112 is indicative of the linear combination of the transverse modes that is present in multimode fiber 1102 at the location of the corresponding MMF coupler 1106. Since mode scramblers $1108_2$-$1108_K$ mix up the transverse modes between MMF couplers $1106_1$-$1106_K$, each of signals $1112_1$-$1112_K$ is indicative of a different linear combination of the transverse modes in multimode fiber 1102. One skilled in the art will understand that, if $K \geq N$, then coherent detectors 930 generate enough sampling data to enable DSP 940 to properly invert the mode-mixing matrix corresponding to communication link 120 and recover the data carried by the independently modulated components of the TMM signal transmitted therethrough from a remote transmitter (e.g., transmitter 300) to receiver 900.

In one embodiment, receiver 900 having tap module 1110 can use, as coherent detectors 930, the coherent detectors designed for the detection of PM signals. Coherent detectors for the detection of PM signals are known in the art and disclosed, e.g., in the above-cited U.S. Patent Application Publication No. 2007/0297806 and U.S. patent application Ser. No. 12/338,492. One skilled in the art will understand that receiver 900, employing tap module 1110 and a plurality of coherent detectors for the detection of PM signals, is capable of appropriately detecting optical signals that are produced with the use of both TMM and PM multiplexing. One skilled in the art will further understand that a WDM receiver capable of appropriately detecting optical signals that are produced with the use of all three of the above-mentioned types of multiplexing (i.e., TMM, PM, and WDM) can be constructed by deploying one receiver 900 having both TMM and PM capabilities for each WDM channel of the WDM receiver.

Figure 12:
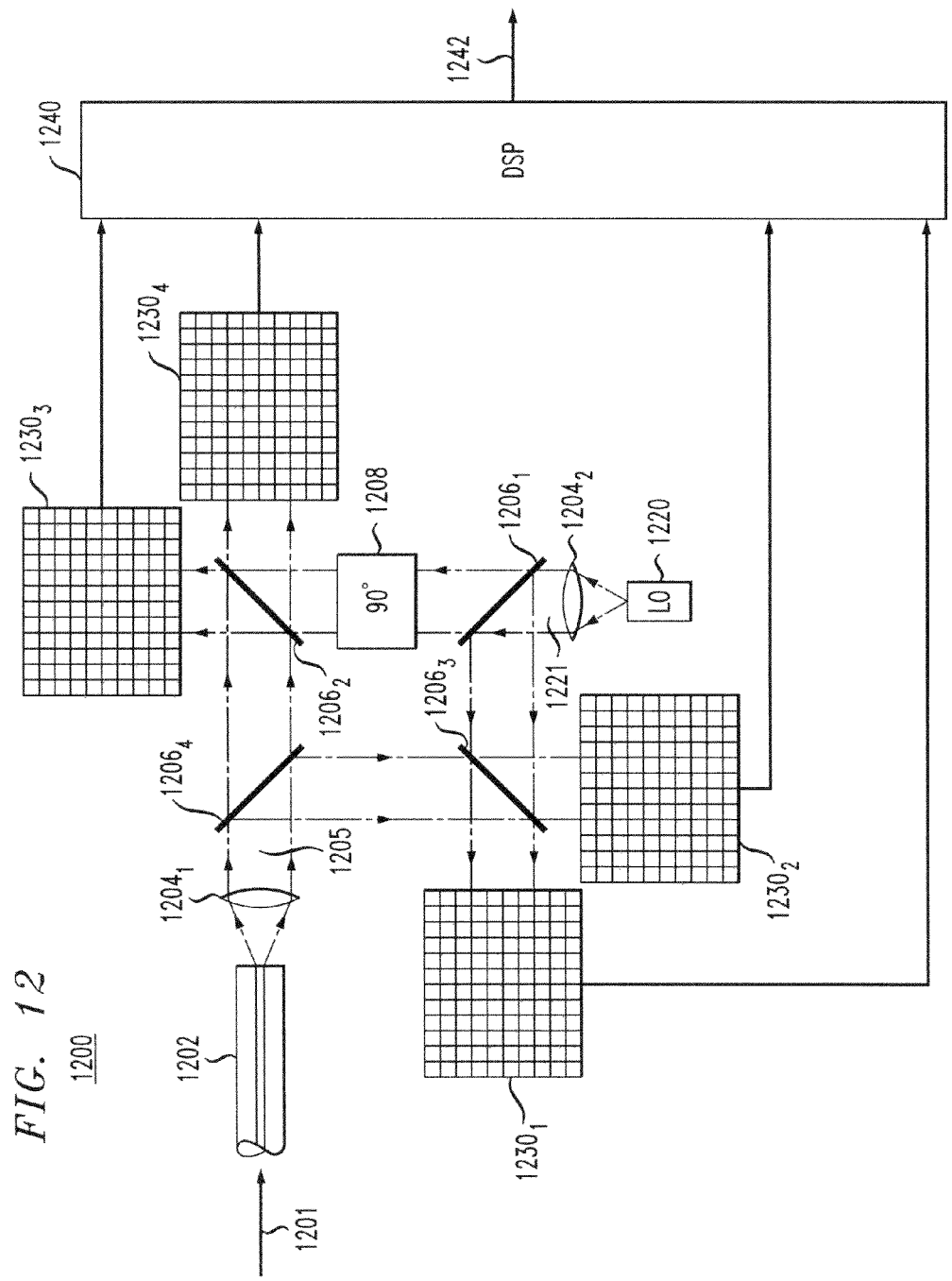
FIG. 12 shows a block diagram of an optical receiver that can be used in a node of the system shown in FIG. 1 according to another embodiment of the invention.

FIG. 12 shows a block diagram of an optical receiver 1200 that can be used in node 110 (FIG. 1) according to another embodiment of the invention. Receiver 1200 receives a TMM signal 1201 (e.g., from link 120) via a multimode fiber 1202. A collimation lens $1204_1$ collimates the diverging light beam produced by fiber 1202 and directs a resulting collimated beam 1205 toward beam splitters $1206_1$-$1206_4$. In one embodiment, each beam splitter 1206 is a semitransparent mirror.

Receiver 1200 also has an LO source 1220 that passes its output through a collimation lens $1204_2$ to form a collimated LO beam 1221. Similar to beam 1205, LO beam 1221 is also directed toward beam splitters $1206_1$-$1206_4$. A 90-degree phase shifter 1208 located between beam splitters $1206_1$ and $1206_2$ introduces a 90-degree phase shift into the beam transmitted therethrough.

Beam splitters $1206_1$-$1206_4$ appropriately split beams 1205 and 1221 into a plurality of sub-beams and then recombine some of these sub-beams to generate four mixed optical beams that impinge onto pixelated receiving surfaces of four arrayed detectors (e.g., CCDs) $1230_1$-$1230_4$, where the mixed optical beams produce the corresponding interference patterns. Each arrayed detector 1230 operates at a sufficiently high speed that enables it to capture and output data corresponding to at least one interference pattern per signaling interval (e.g., symbol period) of TMM signal 1201. Each interference pattern is created at the pixelated receiving surface of arrayed detector 1230 by beating against each other the reference field generated by LO source 1220 and the optical field of TMM signal 1201. Arrayed detector 1230 captures the interference pattern by measuring the light intensity of the pattern at the various pixels of the arrayed detector, thereby creating a two-dimensional cross-sectional intensity profile of the mixed beam.

The data corresponding to the four interference patterns detected by arrayed detectors $1230_1$-$1230_4$ are supplied to a DSP 1240 for processing. If arrayed detectors $1230_1$-$1230_4$ have sufficiently high resolution (e.g., a sufficiently large number of relatively small pixels), then DSP 1240 receives enough data to determine, from the four interference patterns, the modal composition of TMM signal 1201. Herein, the term "modal composition" refers to a representation of TMM signal 1201 in terms of transverse modes of multimode fiber 1202. Typically, such a representation is a linear combination of appropriately weighted transverse modes. The knowledge of the modal composition then enables the DSP to properly invert the mode-mixing matrix corresponding to communication link 120 and recover the data carried by the independently modulated components of the TMM signal transmitted therethrough from a remote transmitter (e.g., transmitter 300) to receiver 1200. DSP 1240 outputs the recovered data via a data stream 1242.

One skilled in the art will understand that arrayed detectors $1230_2$ and $1230_4$ are optional and are used in receiver 1200 to implement a balanced detection scheme similar to that implemented in detector 1030. More specifically, the four interference patterns detected by arrayed detectors $1230_1$-$1230_4$ are processed by DSP 1240 to generate two cross-sectional maps of TMM signal 1201. The first cross-sectional map is an in-phase map of TMM signal 1201, and the second cross-sectional map is a quadrature-phase map of the TMM signal. Having the in-phase and quadrature phase maps of TMM signal 1201 might be advantageous because DSP 1240 can use these maps to make the determination of the modal composition of the TMM signal faster, more accurate, and/or more efficient.

In various embodiments, receiver 1200 might include additional optical components to enable the use of fewer than four separate arrayed detectors. For example, in one embodiment, receiver 1200 might have two relatively large arrayed detectors, wherein: (i) the first detector is partitioned so that one portion of the first detector serves as arrayed detector $1230_1$ while another portion of the first detector serves as arrayed detector $1230_2$ and (ii) the second detector is similarly partitioned so that one portion of the second detector serves as arrayed detector $1230_3$ while another portion of the second detector serves as arrayed detector $1230_4$. In an alternative embodiment, receiver 1200 might have one very large arrayed detector that is partitioned into four portions, each serving as a corresponding one of detectors $1230_1$-$1230_4$.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An optical communication system, comprising:
a multi-path fiber that supports a plurality of transverse modes;
an optical transmitter coupled to a first end of the multi-path fiber and configured to launch an optical transverse-mode-multiplexed (TMM) signal having N independently modulated components such that, at the first end, each of the N independently modulated components corresponds to a respective single transverse mode of the multi-path fiber, where N is an integer greater than one; and
an optical receiver coupled to a second end of the multi-path fiber and configured to process the TMM signal received through the multi-path fiber to recover data carried by each of the N independently modulated components.

2. The invention of claim 1, wherein:
the TMM signal undergoes inter-mode mixing in the multi-path fiber before being received by the optical receiver; and
the optical receiver is configured to reverse effects of the inter-mode mixing to recover the data.

3. The invention of claim 1, wherein:
the multi-path fiber is a multimode fiber; and
the optical transmitter comprises:
a first plurality of fibers; and
an optical mode-coupling (OMC) module disposed between the first plurality of fibers and the multimode fiber, wherein:
the OMC module is configured to filter each of optical signals received from the first plurality of fibers to generate a respective one of N filtered signals and to launch into the multimode fiber the TMM signal that is based on said filtered optical signals so that, at the first end, each of the N filtered optical signals is coupled substantially into a respective single transverse mode of the multi-path fiber
to produce a respective independently modulated component of the TMM signal.

4. The invention of claim 1, wherein the multi-path fiber is a multi-core fiber.

5. The invention of claim 1, further comprising an optical add/drop multiplexer coupled to the multi-path fiber between the optical transmitter and the optical receiver and configured to perform at least one of the following:
   (i) drop from the multi-path fiber all transverse modes corresponding to a selected common optical frequency to remove corresponding one or more independently modulated components from the TMM signal; and
   (ii) populate in the multi-path fiber one or more transverse modes corresponding to a selected vacant optical frequency to add to the TMM signal one or more independently modulated components, wherein the TMM signal is also a wavelength-division-multiplexed signal.

6. An optical transmitter, comprising:
   a first plurality of fibers; and
   an optical mode-coupling (OMC) module disposed between the first plurality of fibers and a multimode fiber, wherein:
      the multimode fiber supports a plurality of transverse modes;
      the OMC module is configured to filter each of optical signals received from the first plurality of fibers to generate a respective one of a plurality of filtered optical signals and to launch into the multimode fiber an optical transverse-mode multiplexed (TMM) signal that is based on said filtered optical signals so that, at a proximate end of the multimode fiber, each of the filtered optical signals is coupled substantially into a respective single transverse mode of the multi-path fiber to produce in the multimode fiber
   a respective optical component of the TMM signal.

7. The invention of claim 6, wherein:
   the multimode fiber supports a total of N transverse modes, where N is an integer greater than one;
   the first plurality of fibers comprises N fibers; and
   at the proximate terminus of the multimode fiber, the OMC module is configured to populate the N transverse modes using the N optical signals received from the N fibers.

8. The invention of claim 6, wherein:
   at the proximate terminus, the OMC module is configured to couple:
      an optical signal from a first fiber of the first plurality substantially into a first selected transverse mode of the multimode fiber; and
      an optical signal from a second fiber of the first plurality substantially into a second selected transverse mode of the multimode fiber; and
   the first mode is different from the second mode.

9. The invention of claim 6, wherein the OMC module comprises:
   a plurality of phase masks, wherein each of said phase masks is (i) disposed between a respective fiber of the first plurality and the multimode fiber and (ii) configured to phase-filter an optical beam produced by said respective fiber; and
   one or more optical elements configured to (i) spatially superimpose phase-filtered beams produced by the phase masks and (ii) apply the superimposed phase-filtered beams to the proximate terminus of the multi-mode fiber to launch the TMM signal.

10. The invention of claim 9, wherein:
    each of the phase-filtered beams produces a respective phase/field-strength (PFS) pattern at the proximate terminus; and
    said respective PFS pattern substantially matches a PFS pattern of said respective single transverse mode.

11. The invention of claim 9, wherein the phase masks are implemented as different sections of a multi-sectional phase mask.

12. The invention of claim 6, wherein the OMC module comprises:
    a spatial light modulator (SLM) disposed between the fibers of the first plurality and the multimode fiber, wherein the SLM comprises a plurality of portions corresponding to the first plurality of fibers, each of said portions configured to phase-filter an optical beam produced by the corresponding fiber; and
    one or more optical elements configured to (i) spatially superimpose phase-filtered beams produced by said portions and (ii) apply the superimposed phase-filtered beams to the proximate terminus of the multimode fiber to launch the TMM signal.

13. The invention of claim 6, wherein the OMC module comprises:
    a volume hologram disposed between the fibers of the first plurality and the multimode fiber and configured to (i) phase-filter a plurality of optical beams produced by the first plurality of fibers and (ii) spatially superimpose phase-filtered beams; and
    one or more optical elements configured to apply the superimposed phase-filtered beams to the proximate terminus of the multimode fiber to launch the TMM signal.

14. The invention of claim 6, further comprising a plurality of optical modulators, each coupled to a corresponding fiber of the first plurality to produce therein the respective optical signal.

15. The invention of claim 14, further comprising a plurality of polarization combiners, each disposed between (i) a pair of modulators from said plurality of modulators and (ii) a corresponding fiber of the first plurality to perform polarization multiplexing for optical signals produced by said pair of modulators and to apply a resulting polarization-multiplexed signal to the corresponding fiber of the first plurality, wherein the TMM signal is also a polarization-multiplexed signal.

16. The invention of claim 14, further comprising a plurality of wavelength multiplexers, each disposed between (i) a corresponding subset of modulators from said plurality of modulators and (ii) a corresponding fiber of the first plurality to perform wavelength-division multiplexing for optical signals produced by said subset of modulators and to apply a resulting wavelength-division-multiplexed signal to the corresponding fiber of the first plurality, wherein the TMM signal is also a wavelength-division-multiplexed signal.

17. The invention of claim 14, further comprising:
    a second plurality of fibers, each configured to feed light into a corresponding optical modulator of the plurality of optical modulators to enable said optical modulator to produce the respective optical signal; and
    one or more lasers optically coupled to the second plurality of fibers to generate and apply thereto said light.

18. A method of generating an optical transverse-mode multiplexed (TMM) signal, comprising:
    splitting an optical beam into N sub-beams, where N is an integer greater than one;
    modulating each of the N sub-beams with data to produce N independently modulated optical signals; and
    at a proximate terminus of a multi-path fiber, coupling into the multi-path fiber the N independently modulated optical signals to produce N independently modulated components of the TMM signal, wherein:
       the multi-path fiber supports a plurality of transverse modes; and
       each of the N independently modulated optical signals is coupled into the multi-path fiber such that a resulting independently modulated component of the TMM signal corresponds to a respective single transverse mode of the multi-path fiber at the proximate terminus of the multi-path fiber.

19. An optical transmitter, comprising:
a first plurality of fibers; and
an optical mode-coupling (OMC) module disposed between the first plurality of fibers and a multimode fiber, wherein:
the multimode fiber supports a plurality of transverse modes;
the OMC module is configured to process optical signals received from the first plurality of fibers to launch into the multimode fiber an optical transverse-mode multiplexed (TMM) signal that is based on said received optical signals;
for each fiber of the first plurality, the OMC module is configured to filter the respective optical signal received from the fiber such that a resulting optical component of the TMM signal corresponds to a respective single transverse mode of the multimode fiber at a proximate terminus of the multimode fiber; and
the OMC module comprises:
a plurality of phase masks, wherein each of said phase masks is (i) disposed between a respective fiber of the first plurality and the multimode fiber and (ii) configured to phase-filter an optical beam produced by said respective fiber; and
one or more optical elements configured to (i) spatially superimpose phase-filtered beams produced by the phase masks and (ii) apply the superimposed phase-filtered beams to the proximate terminus of the multimode fiber to launch the TMM signal.

20. The invention of claim 19, wherein:
each of the phase-filtered beams produces a respective phase/field-strength (PFS) pattern at the proximate terminus; and
said respective PFS pattern substantially matches a PFS pattern of said respective single transverse mode.

21. The invention of claim 19, wherein the phase masks are implemented as different sections of a multi-sectional phase mask.

22. An optical transmitter, comprising:
a first plurality of fibers;
an optical mode-coupling (OMC) module disposed between the first plurality of fibers and a multimode fiber, wherein:
the multimode fiber supports a plurality of transverse modes;
the OMC module is configured to process optical signals received from the first plurality of fibers to launch into the multimode fiber an optical transverse-mode multiplexed (TMM) signal that is based on said received optical signals; and
for each fiber of the first plurality, the OMC module is configured to filter the respective optical signal received from the fiber so that a resulting filtered optical signal is coupled into a respective set of one or more transverse modes of the multimode fiber at a proximate terminus of the multimode fiber to produce in the multimode fiber a respective optical component of the TMM signal;
a plurality of optical modulators, each coupled to a corresponding fiber of the first plurality to produce therein the respective optical signal; and
a plurality of polarization combiners, each disposed between (i) a pair of modulators from said plurality of modulators and (ii) a corresponding fiber of the first plurality to perform polarization multiplexing for optical signals produced by said pair of modulators and to apply a resulting polarization-multiplexed signal to the corresponding fiber of the first plurality, wherein the TMM signal is also a polarization-multiplexed signal.

23. An optical transmitter, comprising:
a first plurality of fibers;
an optical mode-coupling (OMC) module disposed between the first plurality of fibers and a multimode fiber, wherein:
the multimode fiber supports a plurality of transverse modes;
the OMC module is configured to process optical signals received from the first plurality of fibers to launch into the multimode fiber an optical transverse-mode multiplexed (TMM) signal that is based on said received optical signals; and
for each fiber of the first plurality, the OMC module is configured to filter the respective optical signal received from the fiber so that a resulting filtered optical signal is coupled into a respective set of one or more transverse modes of the multimode fiber at a proximate terminus of the multimode fiber to produce in the multimode fiber a respective optical component of the TMM signal;
a plurality of optical modulators, each coupled to a corresponding fiber of the first plurality to produce therein the respective optical signal; and
a plurality of wavelength multiplexers, each disposed between (i) a corresponding subset of modulators from said plurality of modulators and (ii) a corresponding fiber of the first plurality to perform wavelength-division multiplexing for optical signals produced by said subset of modulators and to apply a resulting wavelength-division-multiplexed signal to the corresponding fiber of the first plurality, wherein the TMM signal is also a wavelength-division-multiplexed signal.

24. An optical transmitter, comprising:
a first plurality of fibers; and
an optical mode-coupling (OMC) module disposed between the first plurality of fibers and a multimode fiber, wherein:
the multimode fiber supports a plurality of transverse modes;
the OMC module is configured to process optical signals received from the first plurality of fibers to launch into the multimode fiber an optical transverse-mode multiplexed (TMM) signal that is based on said received optical signals; and
for each fiber of the first plurality, the OMC module is configured to filter the respective optical signal received from the fiber such that a resulting optical component of the TMM signal corresponds to a respective single transverse mode of the multimode fiber at a proximate terminus of the multimode fiber;
a plurality of optical modulators, each coupled to a corresponding fiber of the first plurality to produce therein the respective optical signal;
a second plurality of fibers, each configured to feed light into a corresponding optical modulator of the plurality of optical modulators to enable said optical modulator to produce the respective optical signal; and
one or more lasers optically coupled to the second plurality of fibers to generate and apply thereto said light.

* * * * *